(12) United States Patent
Yu et al.

(10) Patent No.: US 7,191,140 B2
(45) Date of Patent: Mar. 13, 2007

(54) METHOD AND SYSTEM FOR GENERATING OPTIMAL SOLUTIONS FOR OPEN PAIRINGS THROUGH ONE-WAY FIXES AND MATCHING TRANSFORMATIONS

(75) Inventors: Gang Yu, Austin, TX (US); Gao Song, Austin, TX (US)

(73) Assignee: Navitaire, Inc., Minneapolis, MN (US)

( * ) Notice: Subject to any disclaimer, the term of this patent is extended or adjusted under 35 U.S.C. 154(b) by 1154 days.

(21) Appl. No.: 09/867,251

(22) Filed: May 29, 2001

(65) Prior Publication Data

US 2003/0225598 A1 Dec. 4, 2003

(51) Int. Cl.
*G06F 9/44* (2006.01)

(52) U.S. Cl. .......................................... 705/7
(58) Field of Classification Search .................. 705/5, 705/7, 8, 9
See application file for complete search history.

(56) References Cited

U.S. PATENT DOCUMENTS

| 6,253,147 B1 | 6/2001 | Greenstein |
| 6,408,276 B1 | 6/2002 | Yu et al. |
| 6,651,046 B1 * | 11/2003 | Sato et al. .................. 706/13 |

FOREIGN PATENT DOCUMENTS

EP 1072991 A2 1/2001

OTHER PUBLICATIONS

Rittri et al "Scheduling Pilot Training", Oct. 2000, ILOG International Users Meeting, http://users.ilog.com, pp. 1-13.*
International Search Report for PCT/OS02/16491 mailed May 2, 2003.
Vance, "Airline Crew Scheduling: A New Formation and Decomposition Algorithm", School of Industrial and Systems Engineering, Georgia Inst. of Technology, Jul. 5, 1994, pp. 1-32.
Vance, "A Heuristic Branch-and-Price Approach for the Airline Crew Scheduling Problem", Jun. 23, 1997, pp. 29.
Anbil, et al., "Recent Advances in Crew-Pairing Optimization at American Airlines", Interfaces, 1991, V21, pp. 62-74.
Anbil, et al., "Column Generation and the Airline Crew Scheduling Problem," Documenta Mathematica, Extra Volume, ICM, 1998, pp. 677-686.
Wei, et al., "Optimization Model and Algorithm for Crew Management During Airline Irregular Operations", Journal of combination Optimization 1, pp. 305-321, Kluwer Academic Publishers (1997), The Netherlands.
Song, et al. "A decision Support Framework for Crew Management During Airline Irregular Operations", Operations Research in the Airline Industry, pp. 259-286, Kluwer Academic Publishers (1988) United States.

* cited by examiner

*Primary Examiner*—Romain Jeanty
(74) *Attorney, Agent, or Firm*—Oppenheimer Wolff & Donnelly LLP

(57) ABSTRACT

Open Pairings occurring during airline operations are repaired n at a time (where n is an integer) in near real time through use of two solution paths, one involving one-way fixes, and the other matching transformations. From the resulting multiple solutions, one is selected which is of least cost to the airline.

13 Claims, 10 Drawing Sheets

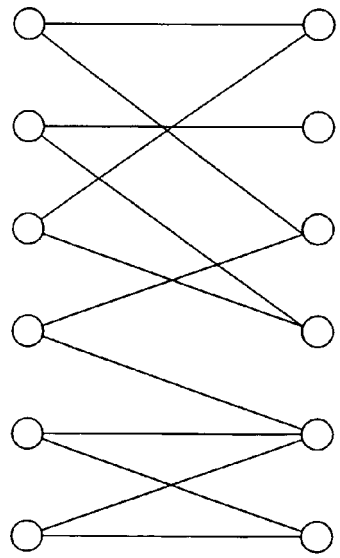 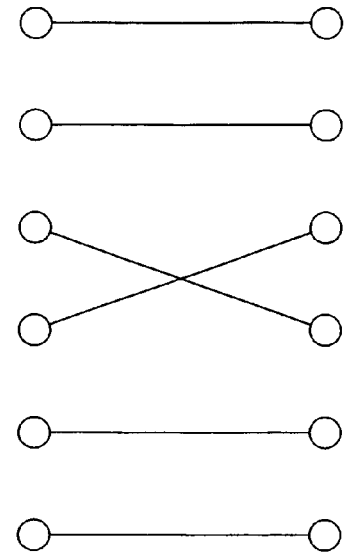
FIG. 11a    FIG. 11b
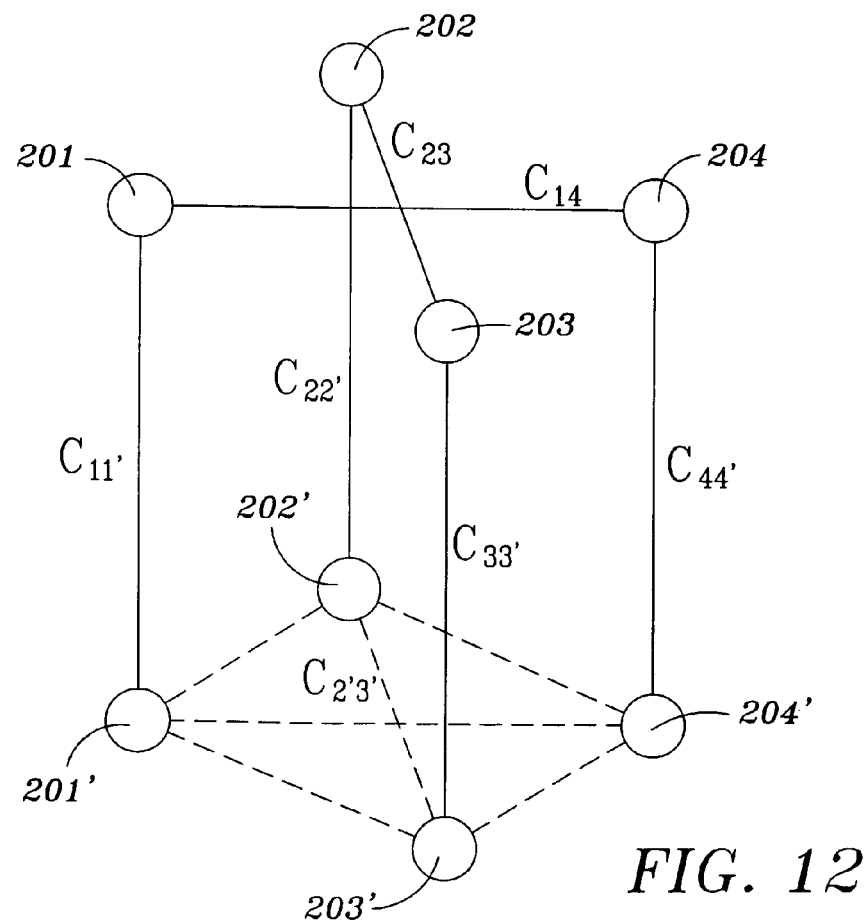
FIG. 12

METHOD AND SYSTEM FOR GENERATING OPTIMAL SOLUTIONS FOR OPEN PAIRINGS THROUGH ONE-WAY FIXES AND MATCHING TRANSFORMATIONS

RELATED APPLICATION

U.S. patent application Ser. No. 09/364,154, now U.S. Pat. No. 6,408,276 for "Crew Optimization Engine For Repair Of Pairings During Irregular Aircraft Operations", assigned to the assignee of the present invention.

FIELD OF THE INVENTION

The invention relates generally to decision support tools, and more particularly to a method and system for generating optimized solutions in near real time to cure irregularities in n crew/flight pairings through two solution paths, namely an integer program data structure and a matching transformation.

BACKGROUND OF THE INVENTION

Major U.S. airlines operate up to 5,000 flights per day, and have to contend with crew recovery problems when a scheduled pairing of crew members with a sequence of flights is broken. Such broken pairings may occur when crew members do not report to work due to illness or other circumstances, restrictions on flight time are exceeded by a crew member, a flight is delayed or canceled, a flight is diverted to a different destination, a flight is added, or equipment substitutions or swaps become necessary which in turn require new crew members with different qualifications.

Crew rescheduling involves matching crews with a recovery flight schedule and acceptable fleet type as soon as possible in a cost effective way, while ensuring conformance with crew legalities such as government policies including the FARs (Federal Aviation Regulations), union contracts, and company policies.

The following published articles are of general interest: "Optimization Model and Algorithm for Crew Management During Airline Irregular Operations", by Guo Wei, Gang Yu, and Mark Song, Journal Of Combinatorial Optimization, Kluwer Academic Publishers (1997); and "A Decision Support Framework for Crew Management During Airline Irregular Operations", by Mark Song, Guo Wei, and Gang Yu, Operations Research In The Airline Industry, Kluwer Academic Publishers (1998).

The algorithms described in the above publications are very similar. The main features of these algorithms are their use of the space-time network model, in which problems with irregular operation can be physically represented by a network using four types of nodes and five types of network arcs. As a result of this network representation, a mathematical model can be formulated to reflect the problem at hand.

For relatively small problems (number of cities less than 10, number of pairings less than 5, number of flights less than 20), use of the model can achieve an optimal solution. If the size of a problem increases, however, a heuristic method has to be applied in order to get an acceptable solution. The heuristic methods described in these two publications are centered at the decomposition of the given problem, so that a large problem can be divided into a number of smaller problems such that each smaller problem contains exactly one open pairing.

For each smaller problem, the algorithm calls for setting up a sub-network, solving a shortest path network and using a depth-first search method to fix an open pairing. In going through each of these iterations for any normal airline irregular operation problem, the costs in terms of solving time can be very expensive and impractical to support a decision making in a real time environment.

Referring to FIG. 1, a functional block diagram of the system environment disclosed in U.S. patent application Ser. No. 09/364,156 is shown, where an Optimization Server 1 (which in the preferred embodiment is an HP K-570 running an 11.x HPUX operating system), in electrical communication with a user by way of a bi-directional communication path 2 receives a request for optimal solutions to a specific flight schedule disruption. In response to the request, the Optimization Server 1 initializes an Aircraft Optimization Engine 3 by way of a bi-directional communication path 4, and provides the Aircraft Optimization Engine 3 a filename of an Aircraft Problem Specification. The Aircraft Optimization Engine 3 accesses the Aircraft Problem Specification by way of a bi-directional communication path 8, and generates a set of optimal solutions including aircraft reassignments, rescheduling, and reroutings, to overcome the disruption. The solutions are transmitted over communication path 4, and through the Optimization Server 1 and bi-directional path 2 to the user.

The Aircraft Optimization Engine 1 in turn initializes a Crew Optimization Engine 5 by way of a bi-directional communication path 6 to determine whether optimal flight solutions are efficiently supported by flight and service crews. The Crew Optimization Engine 5, upon being initialized, receives a Crew Problem Specification from the user by way of communication path 2, Optimization Server 1, and a bi-directional communication path 7. The Crew Problem Specification includes flight records, Pairing records, and Broken Crew information records. The crew solutions generated by the Crew Optimization Engine 5 are supplied by way of the communication path 7, Optimization Server 1, and communication path 2 to the user.

During operation, the Aircraft Optimization Engine 3 and the Crew Optimization Engine 5 communicate by way of bi-directional communication paths 10 and 11, respectively, with a memory system such as disk storage unit 9 having stored therein memory objects which in the preferred embodiment are C++ objects containing all of the data used by the optimization engines to solve problems. For example, the C++ object for each flight would capture all information about a given flight. More specifically, a flight object would contain object members such as a flight's departure city, arrival city, departure time, arrival time as well as crewmembers that are assigned to this flight. The object would also contain some basic member functions that allow the engine to access these data members and set/reset them. The C++ objects in turn are created and updated by the Data Collection Unit 12 and the Data Update Unit 13, respectively. More particularly, the Data Collection Unit 12 receives flight data, Open Flight data, crew data, reserve data, pairing data and open pairing data from the user by way of bi-directional communication path 14. The Data Collection Unit 12 also creates C++ objects which are supplied by way of a bi-directional communication path 15 for storage in the disk storage unit 9, at memory locations specified by a Memory Mapping Unit 16 by way of a bi-directional communication path 17. Further, the Data Update Unit 13 receives revisions to the C++ objects from the user over a bi-directional communication path 18, and supplies corrections through a bi-directional communication path 19 to the objects identified by the Memory Mapping Unit 16.

The following data is needed for setting up the C++ database for the Crew Optimization Engine:

In an object oriented language environment, all of the flight information described above can be stored in a flight record as an object, and all of the flight records may be saved in an array structure for fast retrievals. Further, all of the crew information described above can be stored in a crew record as an object, and all the crew records may be saved in an array structure for fast retrievals.

In an object oriented language environment, all of the flight, crew, and pairing information can be stored in a pairing record as an object. Further, all of the pairing records may be saved in an array structure for fast retrievals.

The Memory Mapping Unit 16 receives control signals from the user over a bi-directional communication path 20, and in response thereto identifies the addresses of the C++ objects in the disk storage unit 9 that are being operated upon. By means of the Memory Mapping Unit 16 and the Data Update Unit 13, the user is able to keep the data stored in the Disk Storage Unit 9 current with the data being supplied to the user by way of communication path 2.

Thus, at any given time, the C++ objects of the Disk Storage Unit 9 reflect the existing flight environment, including identification of protected flights which are not to be canceled or delayed; flight sequences or routes for each aircraft; the stations or airports to be used by the aircraft; the fleets assigned to each station; station closure times; fleet arrival and departure curfews (times during which an aircraft is allowed to land and take-off); inviolable and violable maintenance schedules; aircraft seat capacities; fleet operational ground times; operations and flight disruption costs; sub-fleet disruption costs; and revenue and passenger information for each scheduled flight.

It is to be understood that Aircraft Optimization Engine 3, Crew Optimization Engine 5, and Optimization Server 1 each may be microprocessors. Further, the details for updating and formatting flight, crew, and pairing information may be found in U.S. patent application Ser. No. 09/364,156.

Problems are detected and formulated during the course of the database updates. Upon receiving each message, the system analyzes the current operations, checks for any problems, and formulates and records any problems that are detected.

Problems with open pairings are explicitly indicated by pairing update messages and crew update messages received from a user, and problems with open flights are explicitly indicated by the flight update messages. Problems with crew members, however, are detected as the result of current operation analysis.

In repairing open pairings, the above patent application introduces the use of self-connection solution components including the self directly-connected and self indirectly-connected components, skipping-leg solution components including the forward leg-skipping and backward leg-skipping components, an extended-out broken crew solution component, and swap methods including a one-way swap, a two-way swap, and a three-way swap method to cure open flights and open pairings.

A further solution component introduced by U.S. patent application Ser. No. 09/364,196 is a partial self-fix, as illustrated in FIG. 2, where a pairing represented by a flight pattern comprised of flights $f_1$ through $f_4$ is shown with flights $f_2$ and $f_3$ assumed canceled. A breaking point thus occurs at airport B. If a crew member P now located at airport B and having an original base at airport A is returned directly to the originating base A, a partial solution would result because the flight $f_4$ would be an open flight. That is, it would not have a full crew. However, if a deadhead path $D_P$ may be used to bring the crew member P back into the original pairing beginning at airport D, a full solution referred to as an indirect self-fix would be achieved since the flight $f_4$ would now have a full crew. As before, the crew member P is returned to the originating base A. In this case, airport D becomes a recovery point.

If in the above example, airport B and airport D are the same airport, and the crew member P's arrival time $T_a$ at airport B is less than the departure time $T_d$ at airport D, a feasible connection is possible without use of deadhead paths or the creation of any open flights. Such a solution is referred to as a direct self-fix. A direct self-fix solution may occur in the case of a round trip (out and back) flight cancellation, or where a crew member is removed from a sequence of flights to achieve a legal status.

Where a crew member can be brought back to the original pairing by skipping flights, and possibly using deadhead paths, a partial self-fix referred to as a k-skip self-fix occurs. If the crew member cannot be rerouted back to the originating base through use of deadhead paths and skipping flights until after the release time of a duty period, however, an extended-out self-fix is said to have occurred.

Once all possible fixes for curing an open pairing are determined, the cost associated with each fix is determined, and the selection of the fix having the least cost to the airline becomes a complete self-fix.

Referring to FIG. 3, one-way, two-way, and three-way swaps with three flight patterns or pairings ($P_1$, $P_2$, and $P_3$) are illustrated. Assume that flight $f_{12}$ of $P_1$ and flight $f_{23}$ of $P_2$ have been canceled as represented by the "x". The crew members of flight $f_{11}$ may fly a deadhead path $D_{11}$ to crew flight $f_{24}$ of $P_2$, and then fly a deadhead path $D_{22}$ to reassume their duties in $P_1$ beginning with flight $f_{15}$. If the crew of flight $f_{12}$ can avail themselves of a self-fix, whether a Partial Self-Fix or a Complete Self-Fix, by flying the Deadhead Path $D_x$ to crew flight $f_{25}$ and thereby resume their duties in $P_2$, then the irregularities of both $P_1$ and $P_2$ are cured. The above process is referred to as a one-way swap. Since flights $f_{13}$ and $f_{14}$ are left open without a crew, however, such a solution may be too costly for an airline.

Further assume that flight $f_{23}$ of $P_2$ is canceled, and that the crew of flight $f_{22}$ of $P_2$ is flown by deadhead path $D_{21}$ to crew flights $f_{13}$ and $f_{14}$ of $P_2$, and thereafter return by deadhead path $D_{12}$ to their original pairing $P_2$. A complete solution for pairing $P_1$ thus results since no flights except canceled flight $f_{12}$ of the pairing $P_1$ are skipped. The above two processes taken together, where flights are taken from one pairing to cure the first, and from the first to cure the second, constitute a two-way swap. Flights $f_{24}$ and $f_{21}$ of pairing $P_2$, however, would be left open as they would be without a crew. The cost to the airline would include the deadhead costs as well as the cost of the open flights in $P_2$.

If in the process of curing the pairing $P_2$ flights are taken from pairing $P_3$ rather than pairing $P_1$, and thereafter flights are taken from pairing $P_1$ to cure pairing $P_3$, a three-way swap results. For example, the crew from flight $f_{22}$ of $P_2$ may fly deadhead path $D_{23}$ to crew flight $f_{34}$ of $P_3$, and thereafter fly deadhead path $D_{32}$ to reassume their original pairing with flight $f_{26}$. The crew of flight $f_{33}$ of $P_3$ then may fly deadhead path $D_{31}$ to crew flight $f_{14}$ of $P_1$, and thereafter fly deadhead path $D_{13}$ to return to their original pairing $P_3$ by crewing flight $f_{36}$. In this scenario, flight $f_{13}$ of $P_1$, flight $f_{25}$ of $P_2$, and flight $f_{3}$, of $P_3$ would be left open or skipped. The airline again would assume the costs of the deadhead paths and the open flights left after the three-way swap.

The problem thus is solved by determining which of the available solutions is least costly to the airline.

The above methods as presented in U.S. patent application Ser. No. 09/364,156 are limited in the number of pairings which may be called upon to provide solutions, and are subject to a condition where due to the limited resources, deadhead paths may not be available to effect a one-way, two-way, or three-way swap. No facility for providing high order n-way swaps (where n is an integer greater than 3) as a solution component is disclosed. Further, as in the example illustrated by FIG. 3 above, a three-way swap may prove too costly to an airline. A further deficiency in the above system is that with an ever increasing need for more rapid solution generation, improvements over decision tree selection processes, and depth-first-search and shortest-path algorithms is needed.

The present invention provides plural solutions in near real time through two solution paths without need for decision tree selection processes, depth-first-search, or shortest path algorithms, and enlarges the solution domain through the addition of a new solution component, one-way-fix, to include all pairings of an airline in the solution process. N-way swaps thereby become a solution component, and the likelihood of generating a solution which meets the so-called legality rules imposed by airlines, collective bargaining contracts, flight regulations, and other parameters such as costs, is raised to a near certainty.

SUMMARY OF THE INVENTION

A method and system for repairing n open pairings in near real time is disclosed, where n is an integer equal to 1 or greater.

In one aspect of the invention, a solution component referred to as a one-way fix is introduced which dramatically enlarges the scope of the open pairing solution process to include n open pairings at a time, and provides solutions which may include n-way swaps.

In another aspect of the invention, upon determining all deadhead paths among the n pairings, all possible partial self-fix solution components based upon the above deadhead paths are determined among the n pairings. Next, all possible one-way fix solution components are determined. The resulting problem model is operated upon by an integer program for formatting the problem into the integer program data structure for solution by an optimization solder. The above formatting reduces an open pairing problem of high complexity which may be insolvable, into a less complex open pairing problem which is readily solvable.

In still another aspect of the invention, upon determining all deadhead paths among the n pairings, all possible one-way and two-way swaps based upon such deadhead paths are generated. A matching transformation then is applied to the resulting open pairing problem model to provide a simplified weighted matching problem from which solutions complying with the legalities may more easily be generated.

BRIEF DESCRIPTION OF THE DRAWINGS

Additional objects, features and advantages of the present invention will become apparent from the following detailed description when read in conjunction with the accompanying drawings in which:

FIG. 11(a) is a graphical depiction of one-way and two-way swaps interconnecting plural pairings;

FIG. 11(b) is a graphical depiction of FIG. 11(a) upon the occurrence of a matching transformation; and FIG. 12 is a graphical depiction of a solution for four Open Pairings, which are cured through a Matching Transformation.

DESCRIPTION OF PREFERRED EMBODIMENTS

Figure 1:
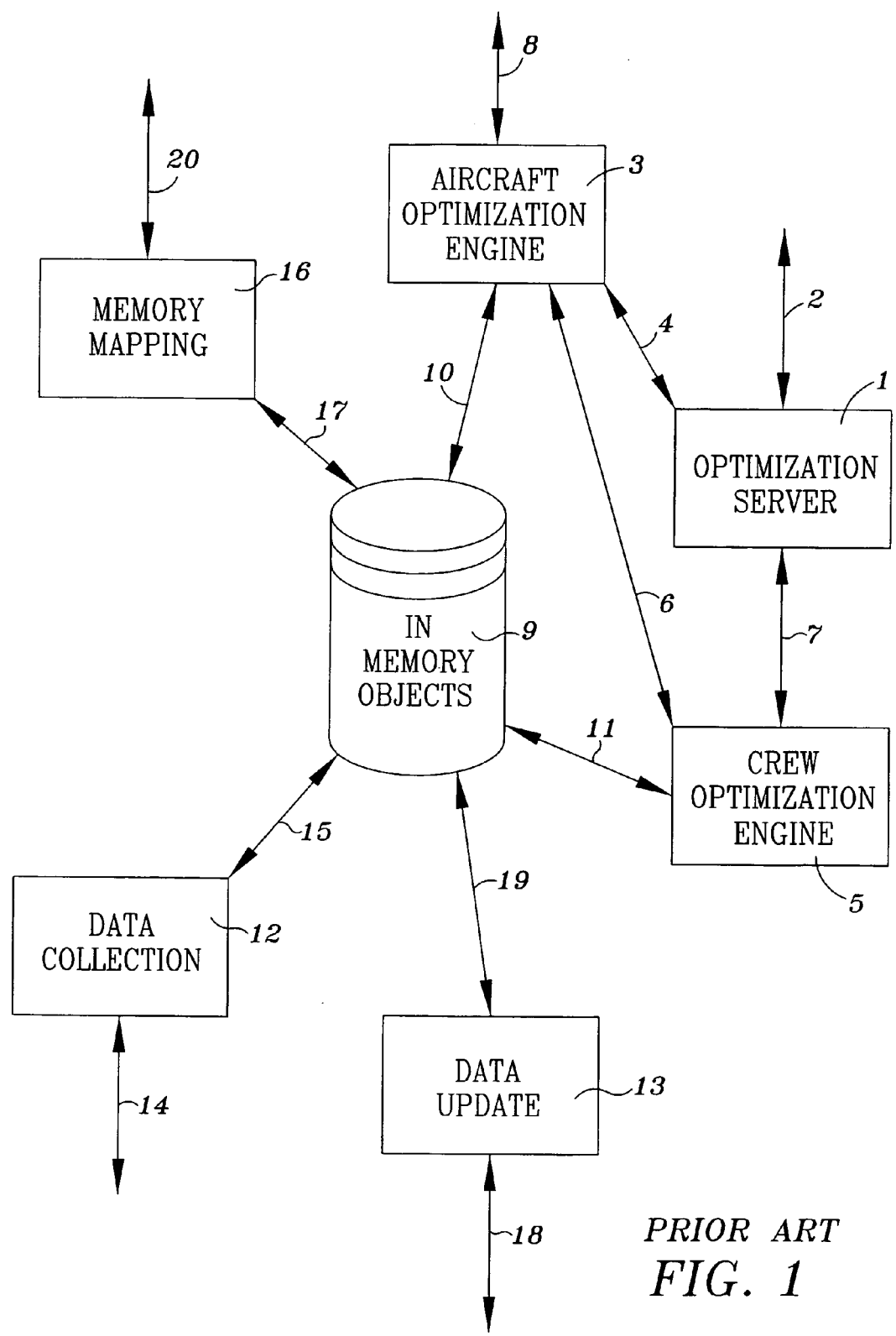
FIG. 1 is a functional block diagram of a prior art system in which the present invention may operate.
Figure 2:
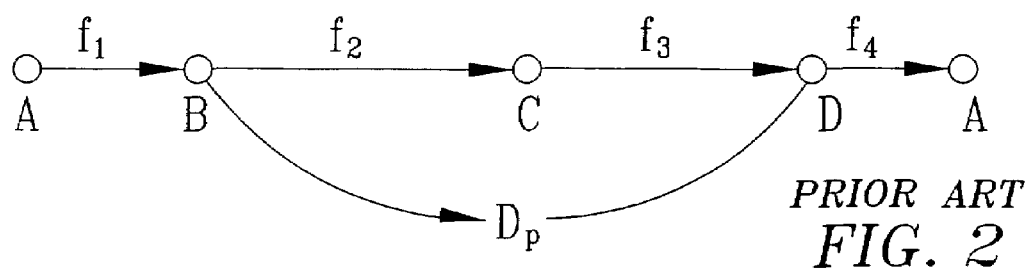
FIG. 2 is a graphic depiction of Partial Self-Fix Solution Components in the prior art.

A preferred embodiment of the invention will now be described with reference to the accompanying drawings. In the description, the following terms, whether capitalized or in lower case, shall have the attendant meanings indicated below when used in this specification:

1. A "Flight Leg", also referred to as "Flight Segment", is a single non-stop flight which is defined by a departure airport, a departure time, an arrival airport, and an arrival time.

2. A "Pairing" or "Flight Pattern" means a sequence of Flight Legs in which crew members are paired with flights that start at a crew base or originating airport, and end at the same crew base. A Pairing may span plural consecutive days, and is said to become broken when a crew member position is not filled with a qualified crew member.

3. "Open Pairing" means that physically a Flight Pattern (as defined below) is no longer connected in either or both space or time with a Pairing. Open Pairings may occur because of flight cancellations, delays, and diversions to unscheduled destinations, because of equipment swaps resulting in a crew not qualified for the equipment, and because of other irregularities.

4. "Connection Time" means the difference in time between the arrival time of one flight at an airport and the departing time of another flight from the airport.

5. "Legality Rules" refer collectively to the operations rules promulgated by an airline, government regulations (e.g., FAA regulations), and the terms of collective bargaining agreements between an airline and labor unions under which a crew must perform their duties. Such Legality Rules may limit the on-duty time of a crew member per a time window, whether a day, week, year, or other time period.

6. A "Feasible Connection" means the relationship between two consecutive flights in a sequence of Flight Legs, where at an airport of connection, time greater than or equal to a minimum connection time required by airline legalities is allowed between flights.

7. A "Duty Period" is comprised of a sequence of Flight Legs separated by Feasible Connection times. A Duty Period begins with the Report Time (as defined below) of a crew, and ends with a crew Release Time (as defined below). A Duty Period usually defines a single working day of a crew.

8. "Open Flight" means that a flight does not have a full crew, or that certain crew positions are not filled with qualified crew members.

9. A "Breaking Point" occurs at the arrival time $T_a$ of a flight at an airport, where an assigned crew member is not able to continue with a next assigned flight. A Breaking Point may also occur at an originating or home base if a first flight in a Pairing is canceled or aircraft equipment is substituted.

10. A "Recovery Point" occurs at the departure time $T_d$ of a flight at an airport, where a crew member may be reassigned to a flight of a Pairing after a Breaking Point in the Pairing has occurred.

11. A "Taking Point" occurs at a departure node and departure time $T_d$ where crew members of an Open Pairing take over flight duties of a Flight Segment in a second Pairing.

12. A "Leaving Point" occurs at an arrival node and arrival time $T_a$, where crew members of an Open Pairing who have been reassigned to a Flight Segment of a second Pairing, leave the second Pairing.

13. A "Returning Point" occurs at a departure node at a departure time $T_d$, where crew member(s) reassume their duties in the assigned Pairing after a Breaking Point.

14. A "Deadhead Path" is Flight Leg or Flight Segment in which crew member(s) fly as passengers.

15. "Illegal Crew" refers to crew members who cannot be assigned to a flight without violating the Legality Rules.

16. "Crew Time Misconnection" occurs when a crew member is at a right airport, but did not arrive in time to catch the next flight on his/her schedule.

17. "Crew Space Misconnection" occurs when a crew member is not at a correct airport for catching a next flight on his/her schedule, or a flight on which the crew member was to serve has been diverted to another airport or canceled.

18. "Working Leg Path" refers to a sequence of flights that connect a pair of airports within a specified time frame, during which crew members may work on the flights in full compliance with the Legality Rules.

19. "Modified Pairing" means an original Pairing combined with one or more of a Deadhead Path and a Working Leg Path to reroute a crew member of an Open Pairing back to his/her original Pairing with or without a legal assignment.

20. "Basic Solution Component" means a Modified Pattern which not only reroutes a crew member back to his/her original Flight Pattern, but also provides the crew member a legal assignment. Examples of Basic Solution Components are a Partial Self-Fix, a Complete Self-Fix, and a One-Way Fix.

21. "Partial Self-Fix" means one of four forms of solutions: a Direct Self-Fix, an Indirect Self-Fix, a K-Skip Self-Fix, and an Extended-Out Self-Fix (all as defined below).

22. "Direct Self-Fix" means that a Feasible Connection is achieved without resort to Deadhead Paths or the skipping of any flights. This could occur when an out-and-back or round trip flight cancellation occurs, or when a crew member is removed from assignment to a sequence of flights to achieve legal status. Note that those flights from which the crew member has been removed from assignment are not considered skipped flights.

23. "Indirect Self-Fix" means that if A and B are respectively a Breaking Point and a Recovery Point in an Open Pairing, and a non-empty Deadhead Path occurs between A and B which would result in a Feasible Solution (as defined below), then by having the crew members of the Open Pairing take the Deadhead Path, a self-fix occurs without skipping any flights except the canceled flight between the Broken Point and Recovery Point from which the crew members were removed.

24. "K-Skip Self-Fix" means that a crew member in an Open Pairing may be returned to his/her original Flight Pattern by skipping k flights and possibly taking one or more Deadhead Paths.

25. "Extended-Out Self-Fix" means that a crew member of an Open Pairing may only be rerouted back to his/her originating base after the originally scheduled Release Time (as defined below) for a Flight Pattern. Use of Deadhead Paths, and possibly flight skipping may be required.

26. "One-Way Swap" means that crew members of an Open Pairing are deadheaded to fill crew positions of one or more flights of a second Pairing to cure the Open Pairing, while the crew members of the second Pairing resume their duties in the second Pairing by skipping those flights in the second Pairing which are being crewed by the crew members of the Open Pairing.

27. "Two-Way Swap" means crew members of a first Open Pairing are deadheaded to fill crew positions of one or more Flight Segments of a second Open Pairing to cure the first Open Pairing, and crew members of the second Open Pairing are deadheaded to fill crew positions of one or more Flight Segments of the first Open Pairing to cure the second Open Pairing.

28. "Three-Way Swap" means crew members of a first Open Pairing are deadheaded to fill crew positions of one or more Flight Segments of a second Open Pairing to cure the first Open Pairing, that crew members of the second Open Pairing are deadheaded to fill crew positions of one or more Flight Segments of a third Open Pairing to cure the second Open Pairing, and that crew members of the third Open Pairing are deadheaded to fill crew positions of one or more Flight Segments of the first Open Pairing to cure the third Open Pairing.

29. "Complete Self-Fix" means a least Cost (as defined below) Partial Self-Fix.

30. "Cost" or "Cost Factor" refers not only to the dollar value costs incurred by an airline in rescheduling crew members, but also the weightings that an airline places on the various perturbations caused by a rescheduling of crew members in view of the Legality Rules and other factors.

31. "Slack Factor" means the number of crew members over the number needed to ensure a Feasible Solution (as defined below).

32. "One-Way Fix" occurs when one or more Flight Segments of a second Pairing is used to fix a first Pairing, with no limitation on the number of flights of the first Pairing which may be skipped.

33. "Feasible Solution" means a Modified Pattern in which a crew member of an Open Pairing is either returned to his/her original base, or provided a legal assignment upon reentering his/her original Flight Pattern. A solution cannot be feasible without conforming to the Legality Rules.

34. An "Infeasible Solution" occurs in a Modified Pattern when at least one crew member of an Open Pairing is not rerouted back to his/her original base.

35. "Full Solution" is a Feasible Solution in which all Open Flights have been cured.

36. "Partial Solution" is a Feasible Solution in which at least one Open Flight remains.

37. "Duty Time" means the time actually spent by a crew member on duty during a Duty Period. Legality Rules limit the total time that may constitute any Duty Period.

38. "Rest Time" means the time between flights that a crew member must be allowed to rest. Legality Rules require that a crew member rest at least a certain amount of time per day during a Duty Period, and at least a certain amount of time per any week.

39. "Report Time" means the time at which a crew member must report for duty to commence a Duty Time.

40. "Release Time" means the time at which a crew member either is released from duty for a rest, or released from a current Pairing.

41. "Matching Transformation" is a process in which an integer program math model representing Open Flight and Open Pairing irregularities is simplified from a problem of insolvable complexity to one in which a Feasible Solution may be efficiently found.

42. "N-Way Swap" refers to a possible solution where any number n of Pairings, where n is an integer equal to 1 or greater, swap flights in order to cure Open Pairings.

43. "Self-Fix" refers to either or both a Partial Self-Fix and a Complete Self-Fix.

The problems confronted by an airline may be conveniently categorized as one of two types: an Open Pairing or an Open Flight. The Open Pairing problem may be overcome by rerouting a crew member through use of Deadhead Paths and other Pairings back to the originally scheduled Pairing. In this regard, a Feasible Solution is sought where all crew members work on as many Open Flights as possible while being sent back to their original base.

Open Flights may result from a skipping of flights to get a crew member in an Open Pairing back to the original crew member base, or from other irregularities such as equipment swaps, flight delays, and flight cancellations which may have existed before a problem solving request is received from a user.

Solutions which cure an Open Pairing may or may not cure all Open Flights. Where the Open Pairing is cured, and as a result all Open Flights have been provided full crews, a Full Solution has occurred. If at least one Open Flight remains, however, only a Partial Solution has occurred.

The invention is directed to combining the Basic Solution Components including a One-Way Fix to form an Open Pairing problem model, and subject to crew and flight constraints, formatting the problem model into an integer program data structure for ready solution by an optimization solver to generate a first set of solutions. Further, upon generation of one-way and two-way swaps, an Open Pairing problem model is formed which undergoes a Matching Transformation to generate a second set of solutions. A final solution is selected from the above two sets of solutions based upon Cost to the airline.

Basic Solution Components

Figure 4:
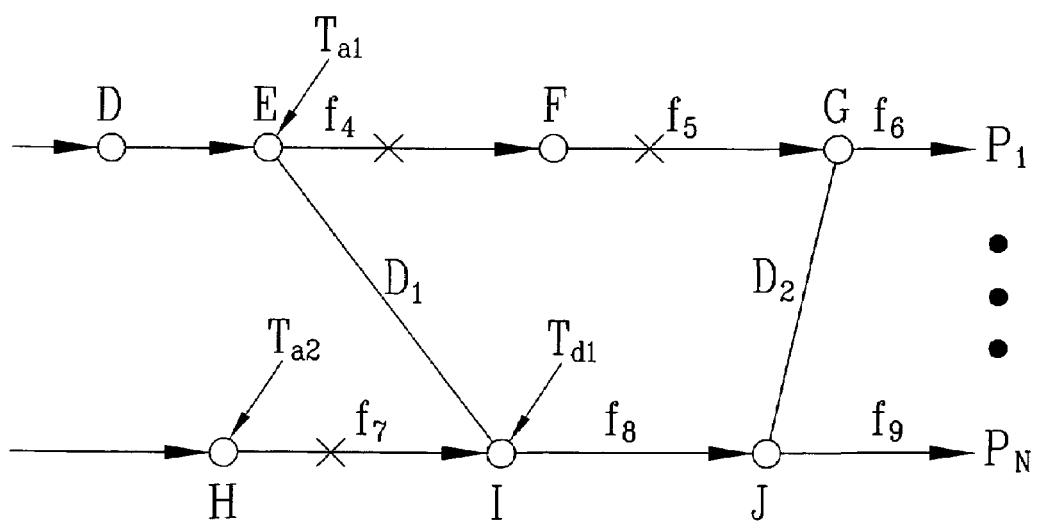
FIG. 4 is a graphic depiction of a One-Way Fix solution component in accordance with the present invention.
Figure 3:
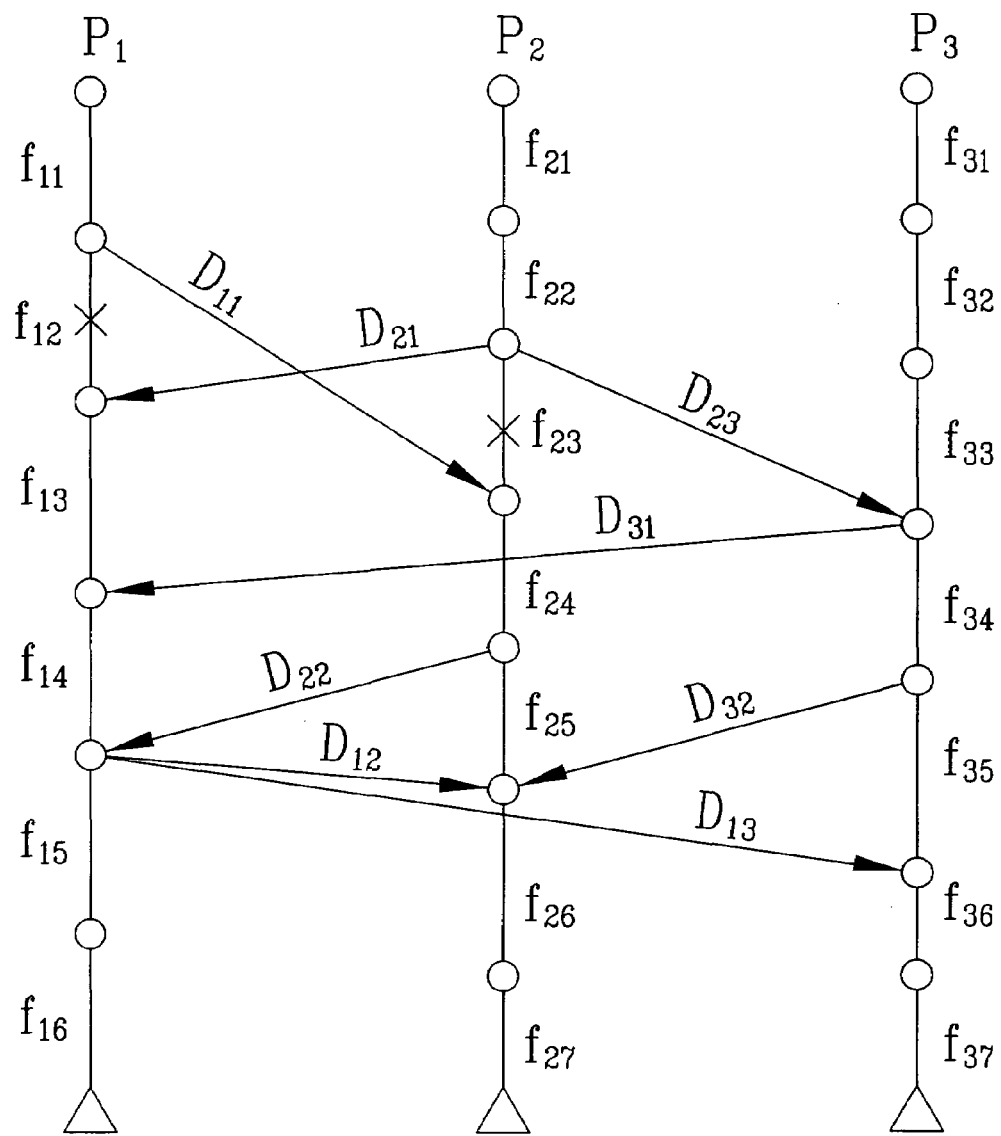
FIG. 3 is a graphic depiction of One-Way Swap, Two-Way Swap, and Three-Way Swap solution components in the prior art.

In order to avail the solution process of increased numbers of Pairings at a time, a Basic Solution Component referred to as a One-Way Fix solution has been created as illustrated in FIG. 4, where a first Flight Pattern referred to as a starting Pairing $P_1$ and comprised of flights $f_4$, $f_5$, and $f_6$ is to be flown by crew member $C_1$, and a second Flight Pattern referred to as the end Pairing $P_2$ and comprised of flights $f_7$, $f_8$, and $f_9$ is to be flown by a crew member $C_2$. In the illustration, we will assume that the flights $f_4$, $f_5$, and $f_7$ are canceled as represented by the "x", and that flights $f_6$, $f_8$, and $f_9$ thus become Open Flights. Airport E thus becomes a Breaking Point in the Flight Pattern of crew member $C_1$ at the arrival time $T_{a1}$, and airport H becomes a Breaking Point in the Flight Pattern of crew member $C_2$ at the arrival time $T_{a2}$. If a Feasible Connection is possible because the arrival time $T_{a1}$ of the crew member $C_1$ occurs before the departure time $T_{d1}$ of flight $f_8$ at airport I, and the difference between the two times is sufficient to meet the Legality Rules, crew member $C_1$ may be flown by Deadhead Path $D_1$ from airport E to airport I of the second Pairing $P_2$ to become a member of the flight $f_8$ crew. The crew member $C_1$ thus is assigned to fly from airport I to airport J as a member of flight $f_8$. At airport J, crew member $C_1$ is assigned to deadhead by way of Deadhead Path $D_2$ to airport G. If the time of arrival $T_{a3}$ of crew member $C_1$ is sufficiently earlier than the departure time $T_{d2}$ of flight $f_6$ from airport G to meet the restrictions of the Legality Rules, the crew member may reenter the first Pairing $P_1$ to become a crew member of flight $f_6$.

In the above example, airport G is a Recovery Point at the departure time $T_{d3}$ of flight $f_6$, where the Flight Pattern of the first Pairing $P_1$ could be resumed, airport I is a Taking Point at the departure time $T_{d4}$ in the second Pairing $P_2$, airport J is a Leaving Point of the second Pairing $P_2$ at the arrival time $T_{a4}$ of flight $f_8$, and airport G is a Returning Point of the first Pairing $P_1$ at the departure time $T_{d1}$ of flight 6. Further, the Deadhead Path $D_1$ from the first Pairing $P_1$ to the second Pairing $P_2$ is referred to as a forward Deadhead Path, and the Deadhead Path $D_2$ from the second Pairing to the first Pairing $D_2$ is referred to as a backward Deadhead Path. In the One-Way Fix solution described above, it is seen that no flights of Pairing $P_1$ have been skipped in the solution for $P_1$ as flights $f_4$ and $f_5$ were canceled.

It is to be understood that a One-Way Fix solution component requires that flights be taken from only one other Pairing.

While the Basic Solution Components including the One-Way Fix solution component described above are seen to repair one Open Pattern at a time, there are further solution components which repair one, two, or more Open Patterns at a time. Such components include the One-Way Swap solution, the Two-Way Swap solution, the Three-Way Swap solution, and higher order swap solutions. The One-Way Swap, Two-Way Swap, and Three-Way Swap solutions are disclosed in co-pending U.S. patent application Ser. No. 09/364,156 assigned to the assignee of this invention.

Figure 5:
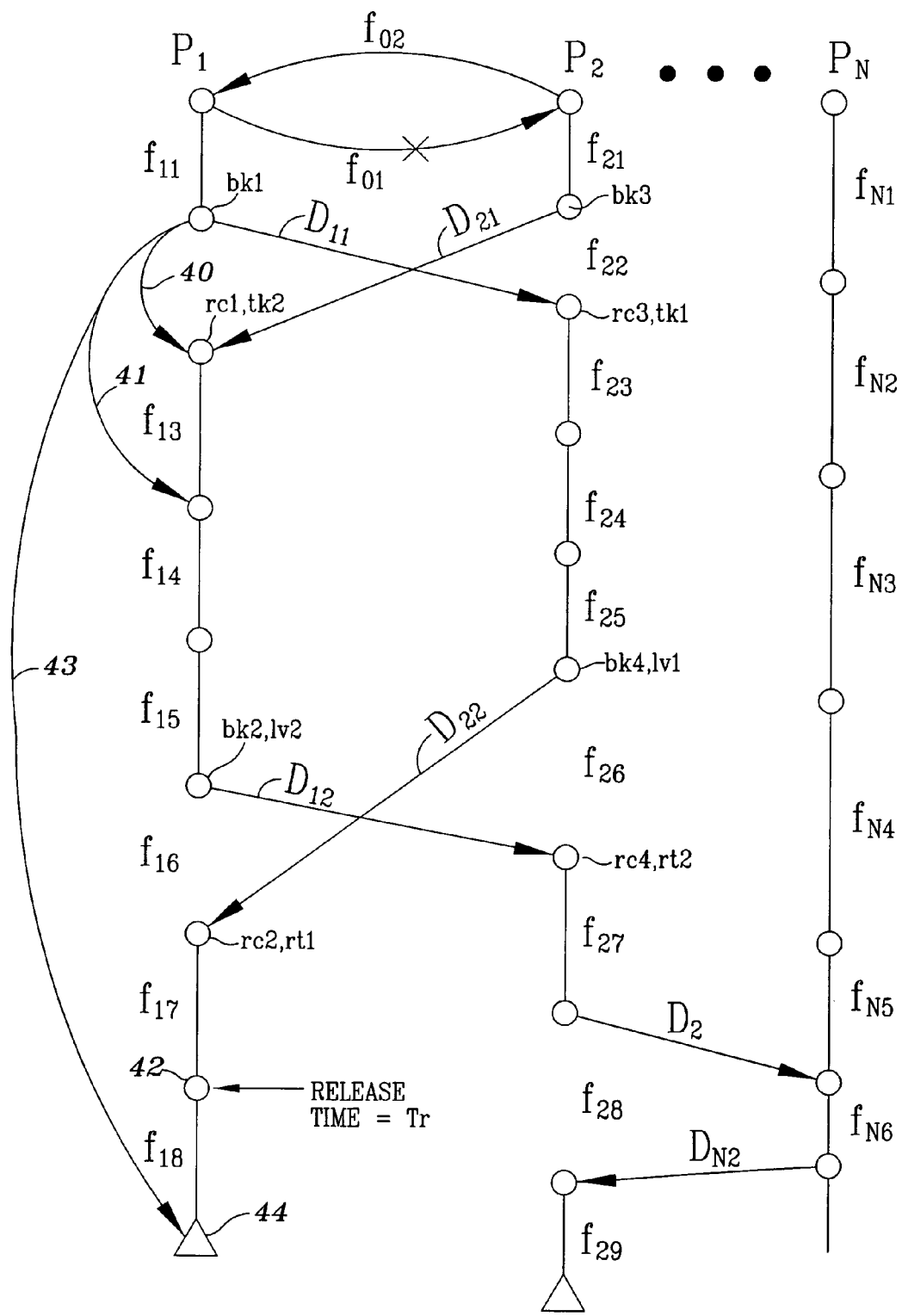
FIG. 5 is a graphical depiction of a One-Way Fix used in conjunction with a Direct Self-Fix, an Indirect Self-Fix, a Complete Self-Fix, a K-Skip Self-Fix, an Extended Out Self-Fix, a One-Way Swap, and a Two-Way Swap solution component in accordance with the invention.

Referring to FIG. 5, an illustration depicting the use of a One-Way Fix solution component in conjunction with the other above described Basic Solution Components and swap solution components is provided. N Flight Patterns $P_1$, $P_2$ . . . $P_n$ are shown. $P_1$ includes Flight Segments $f_{11}$ through $f_{18}$, with flights $f_{12}$ and $f_{16}$ being shown as canceled by blank spaces. $P_2$ includes Flight Segments $f_{21}$ through $f_{26}$, with flights $f_{22}$ and $f_{26}$ being shown as canceled by blank spaces. The $P_1$ Breaking Points bk1 and bk2 occur at the arrival times of flights $f_{11}$ and $f_{15}$, respectively. The Recovery Points rc1 and rc2 occur at the departure times of the $P_1$ flights $f_{13}$ and $f_{17}$, respectively. The $P_2$ Breaking Points bk3 and bk4 occur at the arrival times of flights $f_{21}$ and $f_{25}$, respectively, and the Recovery Points rc3 and rc4 occur at the departure times of flights $f_{23}$ and $f_{27}$, respectively. The irregularity of Pairing $P_1$ caused by the cancellation of flight $f_{12}$ may be fixed by a Deadhead Path 40 from bk1 to rc1. If the Deadhead Path 40 satisfies the Legality Rules, it would create an Indirect Self-Fix which would be a Complete Self-Fix if no flights except the canceled flight $f_{12}$ would be skipped, and a least costly fix will have been created.

If by way of contrast, a Deadhead Path 41 were to be used to bring the crew members of flight $f_{11}$ back into their original Flight Pattern $P_1$ at a point occurring after rc1, and the Legality Rules are satisfied, then a K-Skip Self-Fix occurs since flight $f_{13}$ is skipped in the solution. Further, if the Release Time $T_r$ for Flight Pattern $P_1$ occurs at the airport 44, but the crew members of flight $f_{11}$ cannot be returned to their originating base until after the Release Time, then a Deadhead Path 43 from bk1 could be extended out as indicated by the Deadhead Path 45 to return the crew members to their originating base even though after the Release Time. An Extended Out Self-Fix thereby is created. If the Deadhead Path 43 complies with the Legality Rules, a Feasible Solution which is another version of the K-Skip Self-Fix is provided.

FIG. 5 in addition illustrates One-Way Swap, Two-Way Swap, and One-Way Fix solution components based upon the Deadhead Paths that are shown. For example, forward Deadhead Path D11, flight $f_{23}$, flight $f_{24}$, flight $f_{25}$, and backward Deadhead Path D22 create a One-Way Swap to fix $P_1$. Flights $f_{13}$, $f_{14}$, and $f_{15}$ would be skipped if no further solution components were employed. Canceled flights $f_{12}$ and $f_6$ are not deemed to be skipped flights. However, a second One-Way Fix constituting forward Deadhead Path D21, $f_{13}$, $f_{14}$, $f_{15}$, and backward Deadhead Path D22 not only allows the flights $f_{13}$, $f_{14}$, and $f_{15}$ to be serviced by the crew members of $P_2$, but also fixes $P_2$. As the two One-Way Fixes occur between two Flight Patterns $P_1$ and $P_2$, it also may be said that a Two-Way Swap has occurred between $P_1$ and $P_2$. If each of the above described One-Way Fixes had used only one Flight Segment of a second Pairing to fix the first Pairing, then it could be said that each of the One-Way Swaps also are One-Way Fixes.

A Direct Self-Fix also is shown where the outgoing flight $f_{01}$ of a round trip flight comprising flights $f_{01}$ and $f_{02}$ is shown to be canceled as indicated by the "x". Thus, the crew members remain at their originating airport, with the aircraft to which they have been assigned, to await a new flight schedule.

Returning to $P_2$ of FIG. 5, it is seen that there are no Deadhead Paths between $P_1$ and $P_2$ which will cure the irregularity caused by the cancellation of flight $f_{28}$. The increased functionality provided by a One-Way Fix solution component which allows the solution generation process to avail itself of all available Pairings thus becomes apparent. All of the available Pairings may be searched to find a flight such as $f_{N6}$ of Pairing $P_N$ to which the crew members of flight $f_{27}$ of $P_2$ may be deadheaded to cure the Pairing $P_2$. Through this simplistic added solution component, and the certainty that a self-fix (whether a Complete Self-Fix, or a Partial Self-Fix including Extended-Out Self-Fix) will always be found, the likelihood that all Open Pairings will be cured is dramatically increased. This feature of the invention coupled with the higher order swap solution facility afforded by formulating the Open Pairing problem as an integer program data structure as will be explained below, reduces a problem of N Open Pairings (heretofore thought to be too complex for solution) to a readily solvable problem model.

Solution Generation Process

The solution generation process is comprised of four sub-processes referred to as the setup, preprocessing, solution generation, and postprocessing sub-processes.

Setup: In anticipation of a crew Pairing problem, certain information must be generated and stored for later access before a problem occurs. Specifically, Deadhead Paths with up to three Flight Legs between all airport pairs must be determined and stored in multiply embedded data structure (map<map <multi-map>>) tables hereafter referred to as the deadhead tables.

The deadhead tables are comprised of one-leg, two-leg, and three-leg Deadhead Path tables, wherein the term "leg" refers to a Flight Leg. The following six tables are constructed: one-leg table sorted by the arrival time at the airport at the end of the second leg; two-leg without intermediate rest table sorted by arrival time at the airport at the end of the second leg; two-leg with intermediate rest table sorted by arrival time at the airport at the end of the second leg; three-leg without intermediate rest table sorted by arrival time at the fourth airport; three-leg with intermediate rest between first and second legs table sorted by arrival time at the airport at the end of the third leg; and three-leg with intermediate rest between second and third legs table sorted by arrival time at the airport at the end of the third leg. In constructing the tables, all possible Deadhead Paths between each airport pair are determined, and those Deadhead Paths which meet the Legality Rules are stored. Any two flights are deemed connectable if the time between the arrival time of one flight and the departure time of the second flight at a designated airport is greater than or equal to the minimum connection time.

Figure 6:
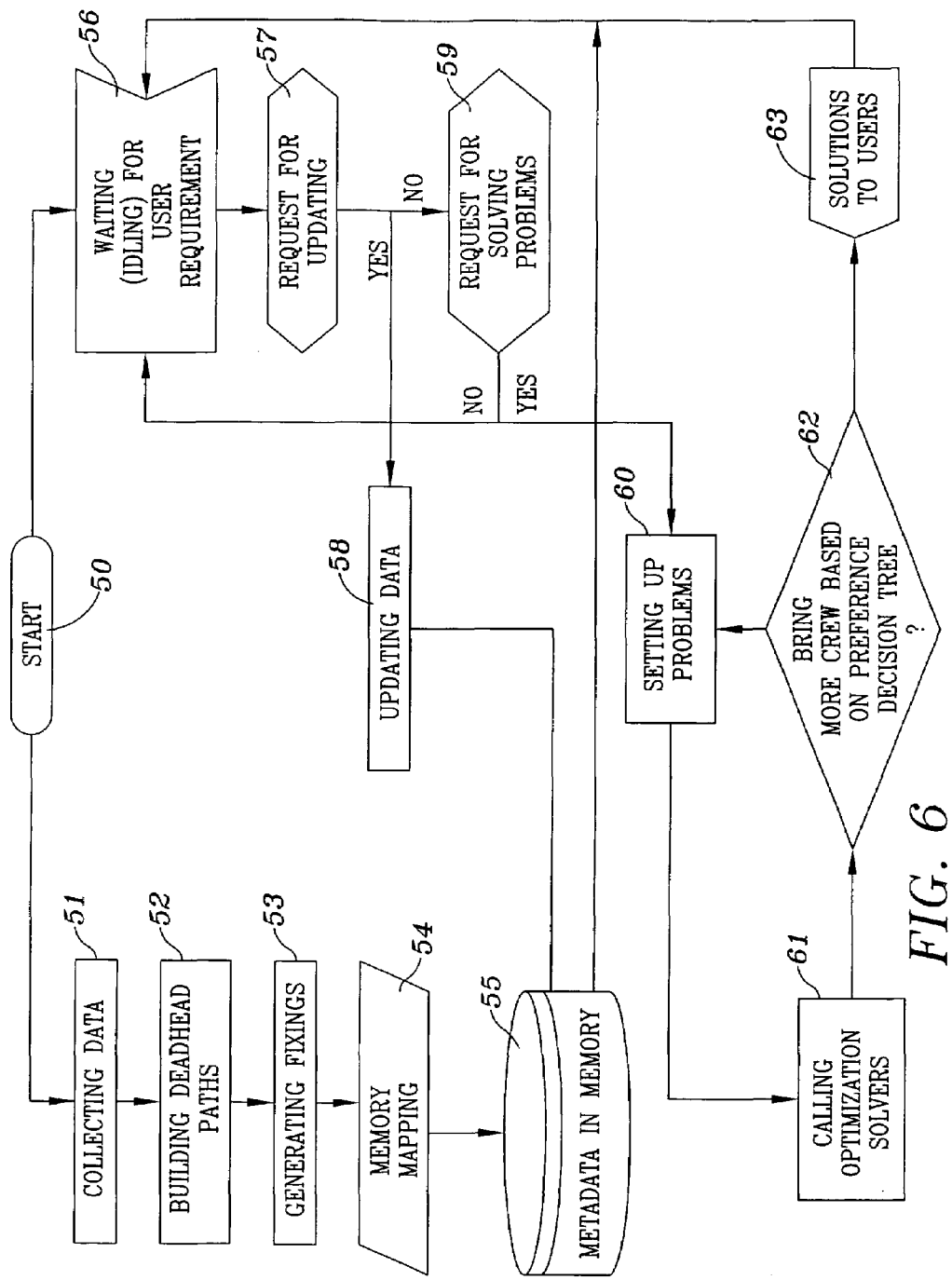
FIG. 6 is a hybrid logic flow/functional block diagram depicting the operation of the invention.

An overview of the solution generation process is illustrated in a hybrid logic flow/functional block diagram of FIG. 6, where upon initiation at logic step 50, a data collection process commences at logic step 51. The data which is collected includes all applicable FAA rules, airline operational rules, and collective bargaining and other contractual rules which may exist that collectively form the Legality Rules that must be complied with by an airline. In addition, flight information including the following must be collected:

i. Flight ID (the flight number used for airline operation).
ii. Feet Type (aircraft equipment type).
iii. Arrival City of scheduled flight.
iv. Departure City of scheduled flight.
v. Arrival Time of scheduled flight.
vi. Departure Time of scheduled flight.
vii. Crew Information including crew members, crew positions for which each crew member is qualified, crew ID (crew's unique identification), and list of Pairings to which a crew member is assigned during a Duty Period.
viii. Pairing Information including Pairing ID (unique ID of the Pairing), Start Time (starting time of each Pairing), End Time (end time of each Pairing), Base (originating crew base), Flight List (sequence of flights assigned to a particular Pairing).

From logic step 51, the solution process proceeds to logic step 52 to build Deadhead Paths having up to three Flight Legs from the metadata, and develop therefrom a deadhead table as previously described above. The logic flow process thereafter moves from logic step 52 to logic step 53 to generate all possible Partial, Complete, and One-Way Fix solutions to imaginary irregular problems based upon presumed Breaking, Recovery, Taking, Leaving, and Returning Points in the Pairings selected from the metadata. Logic steps 51 through 53 constitute the setup stage of solution generation.

The logic flow process continues from logic step 53 to logic step 54 where the deadhead and fixings tables are formatted for storage into the metadata memory at logic step 55. The metadata memory is regularly updated for later use in solving crew recovery problems. The performance of the solution generation process in resolving real problems thereby is improved.

Logic steps 51 through 55 comprise the setup sub-process of the solution generation process of the present invention.

Preprocessing:

After the metadata has been stored in memory at logic step 55, the logic flow process continues to logic step 56, where the solution generation process awaits a user request. If a user request is received at logic step 56, the logic flow process selects Modified Pairings from the metadata memory within a time window specified by the user, and formats the Modified Pairings for use by an optimization solver by executing the mathematical integer program formulation of equations (1) through (3) below. More particularly, the logic flow process proceeds from logic step 56 to logic step 57 to determine whether the user has requested a metadata update. If so, the logic flow process moves from logic step 57 to logic step 58 to collect current flight, crew, Pairing, and Legality Rule information, which is used to update the currently stored metadata at logic step 55. Upon completing the update, the logic flow process proceeds from logic step 55 to logic step 56 to await a user request as before described.

If at logic step 57 a request for updating the metadata is not detected, the logic flow process continues from logic step 57 to logic step 59 to determine whether a request for solving a crew recovery problem has been made. If not, the logic flow process returns to logic step 56 to await a new user request. If a request to solve a crew recovery problem is detected at logic step 59, however, the logic flow process proceeds from logic step 59 to logic step 60 where the problem reported by the user is formulated into an integer program data structure as will be explained below.

Logic steps 57 through 60 comprise the preprocessing sub-process of the solution generation process of the present invention.

Information in the metadata memory of logic step 55 is used by the integer program of logic step 60 to prepare an Open Pairing problem model for solution by the optimization solver of logic step 61. More particularly, information relating to available crew resources, Deadhead Paths, Partial, Complete, and One-Way Fixes, and One-Way and Two-Way Swaps that were generated during the setup stage of the solution generation process are extracted by the integer program of logic step 60. The Open Pairing problem then is formulated into an integer program data structure, and thereafter operated upon by an optimization solver at logic step 61 to generate solutions for curing the Open Pairing problem. If the candidate fixes constructed during the setup stage are not adequate to solve the problem as determined at logic step 61, the logic flow process moves from logic step 61 to logic step 62 to bring further crew resources into play. Thereafter, the logic flow process proceeds to logic step 60 to further formulate the integer program data structure as before described, and then continues to create additional Deadhead Paths, and Partial, Complete, and One-Way Fixes as well as One-Way and Two-Way Swap solutions for use by the Optimization Solver at logic step 61.

Logic step 61 constitutes the solution generation sub-process, which in the preferred embodiment is performed by the CPLEX solver software system, version 7.0, which is commercially available from ILOG Inc. of 1080 Linda Vista Avenue, Mountain View, Calif. 94043.

Postprocessing:

If it is determined at logic step 61 that sufficient candidate solutions and crew resources are available to generate solutions to the problem, solutions are generated, optimized, and checked for compliance with the Legality Rules. The logic flow process thereafter proceeds from logic step 61 through logic step 62 to logic step 63, where the optimized solutions are provided to the user. The logic flow process then returns to logic step 56 to await a new user request.

Logic step 62 and 63 comprise the post processing sub-process of the solution generation method and system.

It is to be understood that the metadata memory 55 of FIG. 6 resides in the disk storage unit 9 of FIG. 1, that logic steps 56, 57, 59, and 63 of FIG. 6 reside in the optimization server 1 of FIG. 1, and that the remaining logic/functional steps of FIG. 6 reside in the crew optimization engine 5 of FIG. 1.

Figure 7:
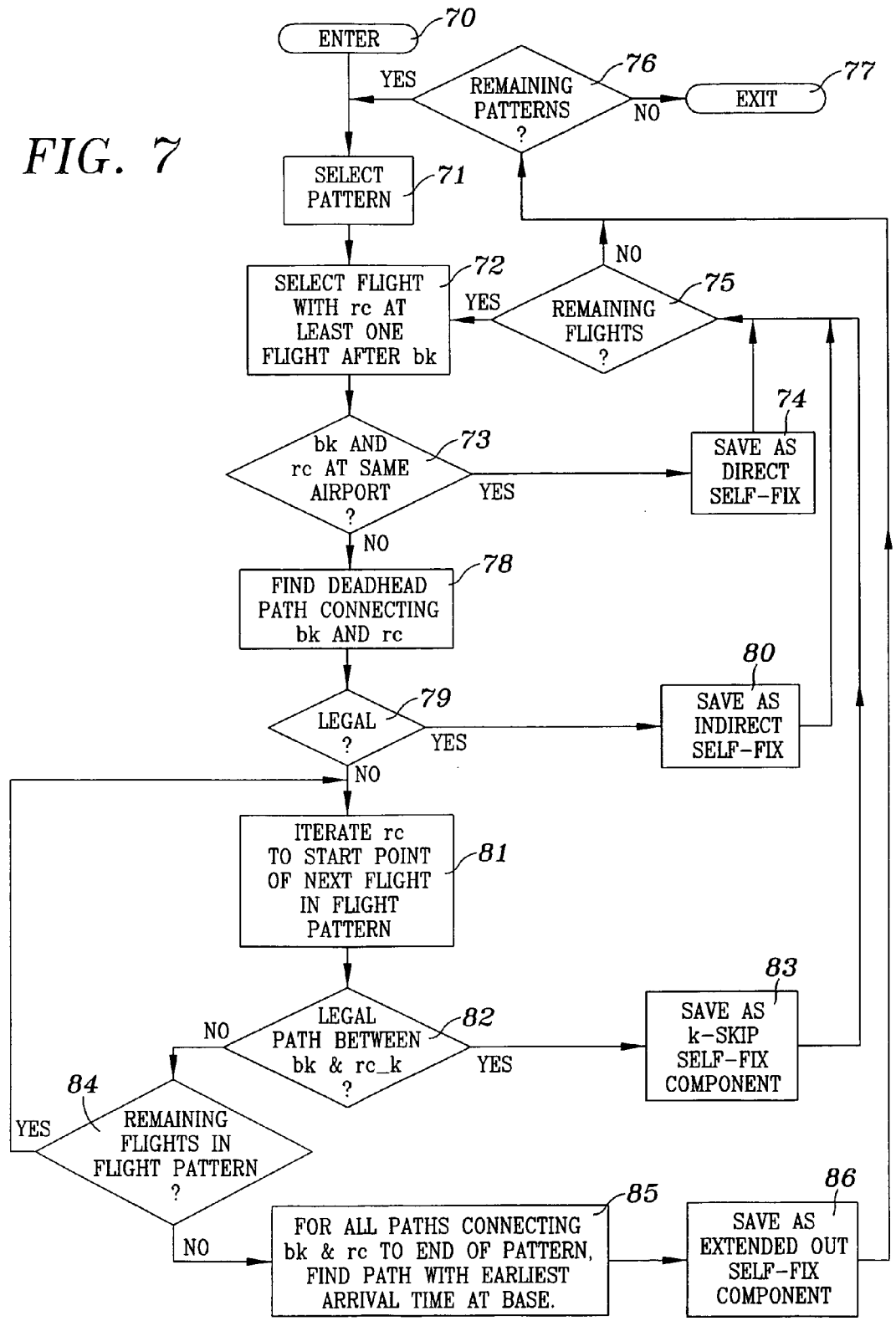
FIG. 7 is a logic flow diagram of the generation of Partial and Complete Self-Fix solution components in accordance with the invention.

Referring to FIG. 7, a logic flow diagram is illustrated for constructing Partial and Complete Self-Fixing solution components as performed at logic steps 53 and 60 of FIG. 6. The logic flow enters at logic step 70 of FIG. 7 and proceeds to logic step 71, where a Flight Pattern is selected from the metadata memory 55 of FIG. 6, and the pattern is searched at logic step 72 of FIG. 7 to identify Breaking Point (bk) and Recovery Point (rc) pairs, where the Recovery Point occurs at least one flight after the Breaking Point. Thereafter, the logic flow proceeds to logic step 73 to determine whether a pair selected at logic step 72 occurs at a same airport. If so, the logic flow then proceeds to logic step 74 where the pair is stored in the metadata memory 55 of FIG. 6 as a Direct Self-Fix.

From logic step 74 of FIG. 7, the logic flow process continues to logic step 75 to determine whether any flights remain in the selected Flight Pattern which have not been processed. If not, the logic flow process proceeds from logic step 75 to logic step 76 to determine whether any further Flight Patterns remain in the metadata memory which have not been processed. If not, the logic flow proceeds from logic step 76 to logic step 77 to exit the logic flow process. If further Flight Patterns remain to be processed, however, the logic flow process moves from logic step 76 to logic step 71 to continue as before described.

If it is determined at logic step 75 that further flights exist in the selected Flight Pattern which have not been processed, the logic flow moves from logic step 75 to logic step 72 where the logic flow process continues as before described.

If it is determined at logic step 73 that the Breaking Point/Recovery Point pair under consideration is not located at the same airport, the logic flow proceeds from logic step 73 to logic step 78 where the metadata memory is searched for Deadhead Paths connecting the Breaking Point and the Recovery Point of the selected pair. It is assumed that there always is at least one Deadhead Path between a Breaking Point and a Recovery Point of a selected pair. Thereafter, at logic step 79 a determination is made whether a Deadhead Path found in logic step 78 complies with the Legality Rules. If yes, the Deadhead Path is saved as an Indirect Self-Fix at logic step 80, and the logic flow proceeds to logic step 75 to continue as before described.

If the Deadhead Path found at logic step 78 does not comply with the Legality Rules as determined at logic step 79, the logic flow process moves from logic step 79 to logic step 81 to iterate the Recovery Point (rc) to the starting point of a next flight in the Flight Pattern. Thereafter, the logic flow process continues from logic step 81 to logic step 82 to determine whether a Deadhead Path is stored in the metadata memory which connects the Breaking Point (bk) to the new Recovery Point (rc_k), and complies with the Legality Rules. If such a legal Deadhead Path is found, the logic flow moves from logic step 82 to logic step 83 where the Deadhead Path is stored in the metadata memory as a K-Skip Self-Fix component. The logic flow then loops back to logic step 75 to continue as before described. If the Deadhead Path found at logic step 82 does not comply with the Legality Rules, the logic flow process continues from logic step 82 to logic step 84 to determine whether there are any remaining flights of the Flight Pattern under consideration to which the Recovery Point (rc) may be moved. If yes, the logic flow proceeds from logic step 84 to logic step 81 to continue as before described. If no flights remain in the Flight Pattern, however, the logic flow proceeds from logic step 84 to logic step 85.

At logic step 85, all paths which connect the Breaking Point (bk) and Recovery Points as iterated flight by flight to the end of the Flight Pattern, and which are stored in the metadata memory at logic steps 74, 80, and 83 are examined. That path providing the earliest arrival time back to the original Flight Pattern of the crew is selected, and thereafter at logic step 86 the path is saved in the metadata memory as an Extended Out Self-Fix component. From logic step 86, the logic flow proceeds to logic step 76 to continue as before described.

In order to conserve computation time in executing the logic flow process of FIG. 7, and more nearly achieve real time solutions, certain assumptions are made based upon current airline practices: three Flight Legs occur on average during any Duty Period; at most four Duty Periods occur in a Flight Pattern; at most 100 Deadhead Paths occur between any two airports; and only Breaking Points and Recovery Points occurring during the first two Duty Periods are considered. With the above assumptions, irregularities occurring in the near future may be anticipated during the setup subprocess. Those irregularities which are not anticipated during the setup sub-process must be handled during the preprocessing sub-process.

Figure 8:
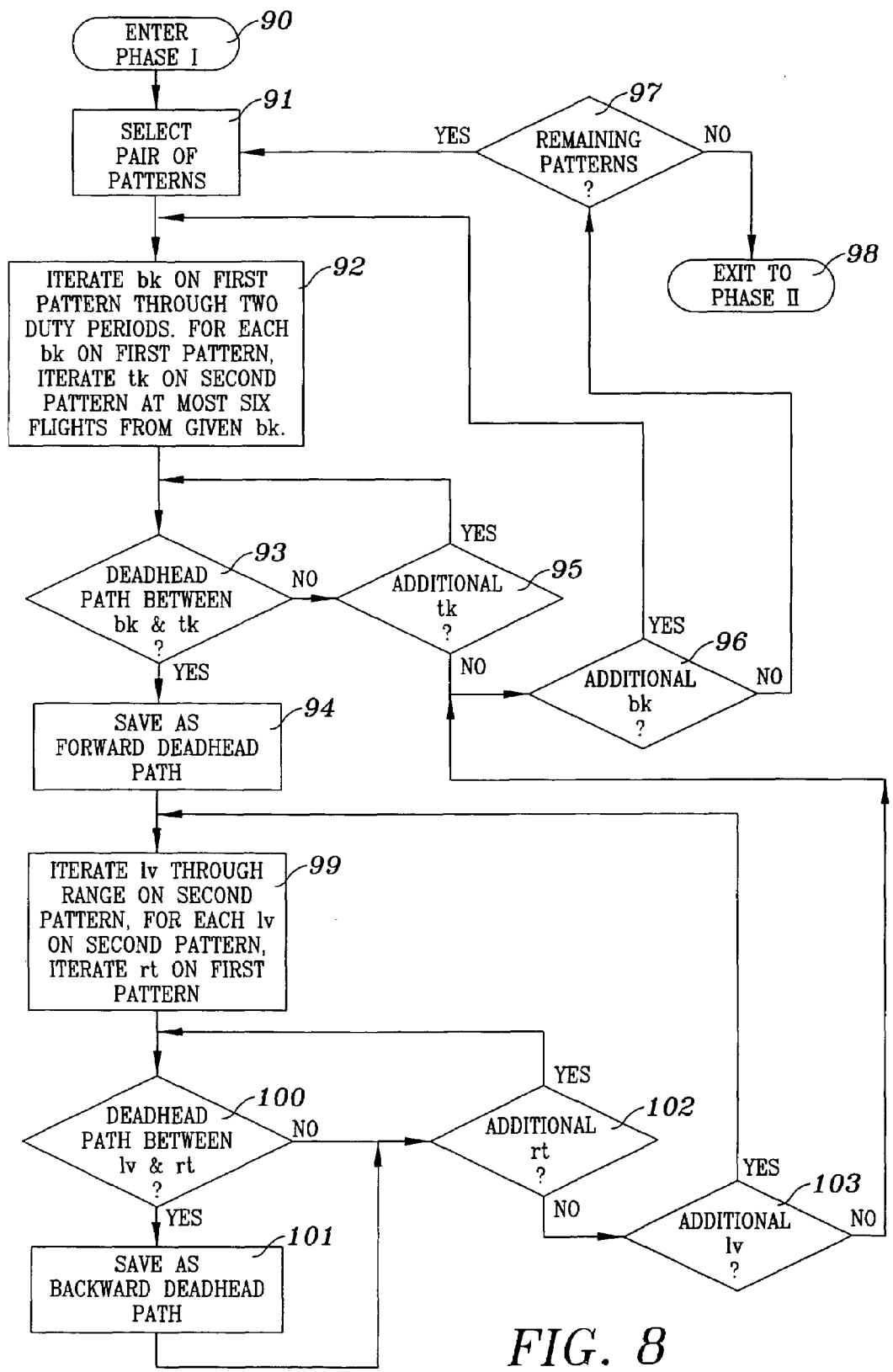
FIG. 8 is a logic flow diagram of Phase I of the generation of One-Way Fixes in Open Pairings, wherein all feasible Deadhead Paths are identified.
Figure 9:
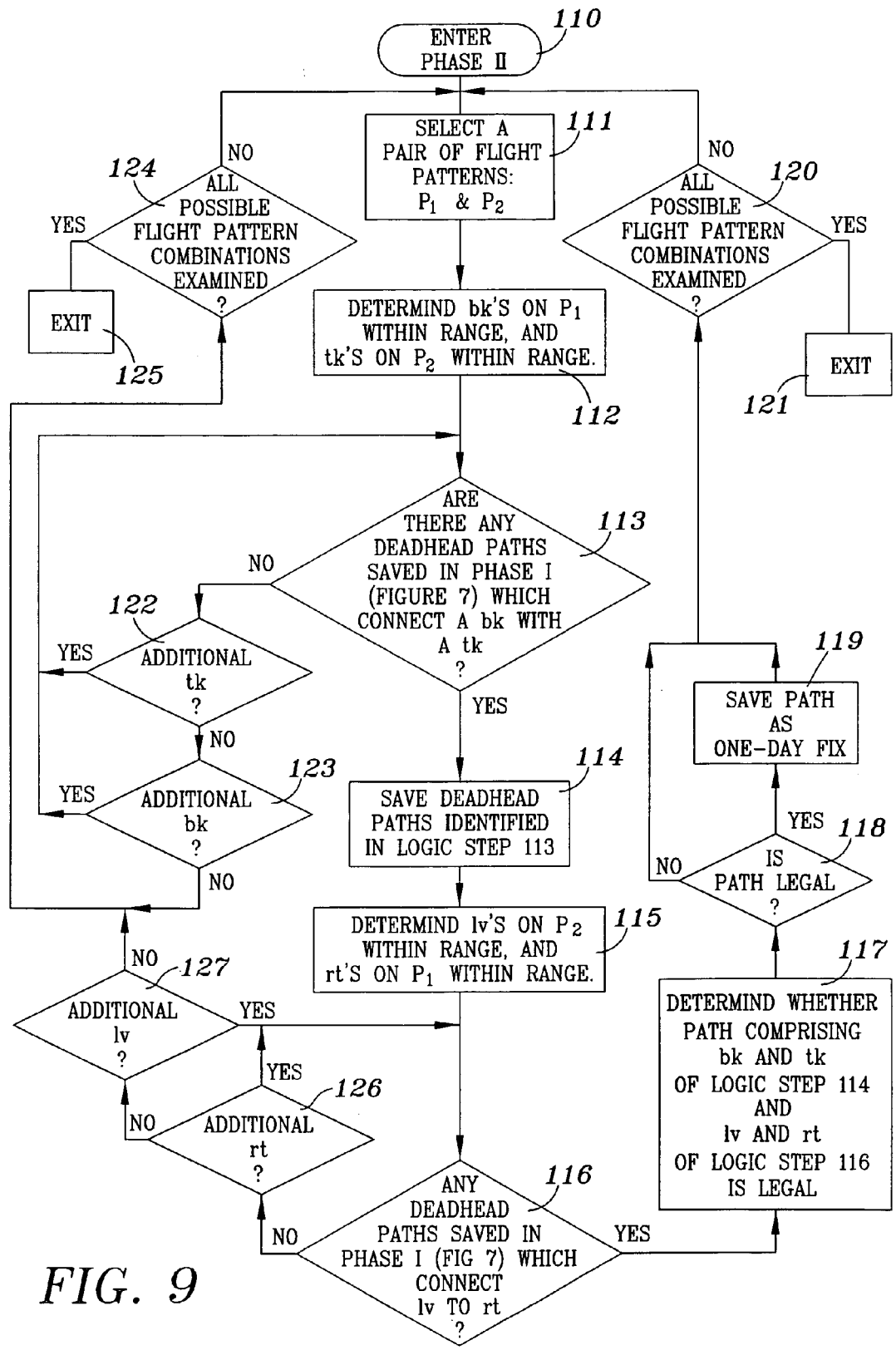
FIG. 9 is a logic flow diagram of Phase II of the generation of One-Way Fixes in Broken Pairings, wherein One-Way Fixes based upon the Deadhead Paths identified in Phase I of FIG. 8 are generated.

FIGS. 8 and 9 respectively illustrate the first phase (Phase I) of finding all possible Deadhead Paths in the metadata memory as occurs in logic steps 52 and 60 of FIG. 6, and thereafter the second phase (Phase II) of finding all One-Way Fixes as occurs at logic steps 53 and 60 of FIG. 6, in determining whether any Modified Flight Patterns are available which cure an irregularity in crew assignments.

In the description which follows, Flight Patterns $P_1$ and $P_2$ are referred to as any Flight Pattern pair selected from the metadata.

Referring to FIG. 8, the logic flow process enters Phase I at logic step 90, and then continues to logic step 91 where any pair of Flight Patterns, $P_1$ and $P_2$, which are stored in the metadata memory are selected. From logic step 91 the logic flow process proceeds to logic step 92, where Breaking Points (bk) on $P_1$ are identified during the first two Duty Periods. For each Breaking Point on $P_1$, Taking Points (tk) on $P_2$ are found over a range of six flights occurring after the time of the Breaking Point. Thereafter, the logic flow process continues from logic step 92 to logic step 93 to determine whether a Deadhead Path which complies with the Legality Rules exists between the current Breaking Point and the first of the Taking Points found for the Breaking Point. If yes, the logic flow process proceeds from logic step 93 to logic step 94, where the Deadhead Path is saved as a forward Deadhead Path.

If the Deadhead Path of logic step 93 does not comply with the Legality Rules, the logic flow process moves from logic step 93 to logic step 95 to determine whether any further Taking Points associated with the current Breaking Point exist on $P_2$. If so, the logic flow process loops back to logic step 93 to continue as before described. If not, the logic flow process continues from logic step 95 to logic step 96 to determine whether any additional Breaking Points in the current $P_1$ were found in logic step 92. If so, the logic flow process moves from logic step 96 to logic step 92 to begin the determination of Taking Points on $P_2$ associated with the next Breaking Point of $P_1$, and the logic flow continues thereafter as before described. If no additional Breaking Points in $P_1$ are found at logic step 96, the logic flow proceeds from logic step 96 to logic step 97 to determine whether there are any additional Flight Patterns to be considered. If not, the logic flow process moves from logic step 97 to logic step 98 to enter Phase II of the logic process. If additional Flight Patterns exist in the metadata memory which have not been processed, however, the logic flow process loops back from logic step 97 to logic step 91 to select a new pair of Flight Patterns. The logic flow process then continues as before described.

After a Deadhead Path is saved at logic step 94, the logic flow process continues to logic step 99, where for a current Breaking Point/Taking Point pair, Leaving Points (lv) occurring on $P_2$ within a range of all Flight Segments following the current Taking Point are determined. Further, for each Leaving Point, Returning Points (rt) on $P_1$ which occur within a range of all Flight Segments occurring after the current Leaving Point on $P_2$ are determined.

From logic step 99, the logic flow process continues to logic step 100 to determine whether a Deadhead Path complying with the Legality Rules exists between a current Leaving Point as determined at logic step 99, and a current Returning Point found in logic step 99 which is associated with the current Leaving Point. If so, the logic flow process continues from logic step 100 to logic step 101 to save the Deadhead Path as a backward Deadhead Path in the metadata memory. If the Deadhead Path under consideration is determined to not comply with the Legality Rules at logic step 100, or is saved at logic step 101, the logic flow process moves to logic step 102 to determine whether any further Returning Points on $P_1$ were found at logic step 99 which are associated with the current Leaving Point under consideration. If so, the logic flow process proceeds from logic step 102 to logic step 100 to continue as before described. If not, the logic flow process moves from logic step 102 to logic step 103 to determine whether any additional Leaving Points were found in logic step 99. If so, the logic flow process continues from logic step 103 to logic step 99 where a next Leaving Point and a next Taking Point associated with the new Leaving Point are retrieved from the metadata memory for processing. Thereafter, the logic flow process continues as before described.

If no additional Leaving Points are determined at logic step 103 to exist in the metadata memory for the Flight Patterns under consideration, the logic flow process moves from logic step 103 to logic step 96 to continue as before described.

Referring to FIG. 9, Phase II of constructing One-Way Fix solution components is illustrated. The logic flow process enters Phase II at logic step 110, and thereafter proceeds to logic step 111 where any pair of Flight Patterns $P_1$ and $P_2$ are selected from the metadata memory. From logic step 111, the logic flow process proceeds to logic step 112 to identify the Breaking Points (bk) on $P_1$ within the first Duty Periods of $P_1$. For each Breaking Point on $P_1$ so identified, the Taking Points (tk) on $P_2$ within a range of six Flight Segments following the Breaking Point under consideration also are identified.

The logic flow process then continues from logic step 112 to logic step 113 to determine whether any of the Deadhead Paths saved in Phase I of FIG. 8 connect a currently considered Breaking Point of $P_1$ with an associated Taking Point of $P_2$ as identified at logic step 112 of FIG. 9. If such a Deadhead Path is identified, the path is temporarily saved at logic step 114 for further processing.

From logic step 114, the logic flow process proceeds to logic step 115 to determine Leaving Points (lv) on $P_2$ within a range of all flights following the Taking Point (tk) of the Deadhead Path temporarily saved at logic step 114. For each such Leaving Point, Returning Points (rt) within a range of all flights following the Leaving Point under consideration are determined. Thereafter, the logic flow process continues from logic step 115 to logic step 116.

At logic step 116, it is determined whether any of the Deadhead Paths saved in Phase I (FIG. 8) connect the Leaving Point now under consideration with the Returning Point now under consideration. If yes, the logic flow process continues from logic step 116 of FIG. 9 to logic step 117, where it is determined whether the Deadhead Path connecting the Breaking Point and Returning Point as saved at logic step 114, and the Deadhead Path connecting the Leaving Point and Returning Point as identified in logic step 116, together provide a flight path between $P_1$ and $P_2$ which complies with the Legality Rules. From logic step 117 the logic flow process continues to logic step 118, and thereafter moves to logic step 120 if the determination at logic step 117 is that the flight path is not in conformance with the Legality Rules. However, if it was determined at logic step 117 that the flight path is in conformance with the Legality Rules, the logic flow process proceeds from logic step 118 to logic step 119 to save the flight path as a One-Way Fix. From logic step 119, the logic flow process moves to logic step 120.

At logic step 120, it is determined whether any further Flight Pattern pairs exist in the metadata memory. If not, the logic flow process exits at logic step 121. If, however, further Flight Pattern pairs exist which have not been processed, the logic flow process proceeds from logic step 120 to logic step 111 to continue as before described.

Returning to logic step 113, if no Deadhead Paths were saved during Phase I which connect the Breaking Point (bk) of the Flight Pattern $P_1$ under consideration with the associated Taking Point (tk) under consideration in Flight Pattern $P_2$, then the logic flow process moves from logic step 113 to logic step 122 to determine whether there are any further Taking Points of Flight Pattern $P_2$ associated with the Breaking Point under consideration which have not been processed. If yes, the logic flow process loops back from logic step 122 to logic step 113 to continue as before described. Otherwise, the logic flow process moves from logic step 122 to logic step 123 to determine whether there are any further Breaking Points in Flight Pattern $P_1$ to be processed. If yes, the logic flow process loops back from logic step 123 to logic step 113 to continue as before described. If no further Breaking Points in the Flight Pattern $P_1$ remain to be processed, the logic flow process moves from logic step 123 to logic step 124 to determine whether all Flight Pattern pairs in the metadata memory have been examined. If not, the logic flow process moves from logic step 124 to logic step 111 to continue as before described. If, however, all possible pairs of Flight Patterns in the metadata memory have been examined, then the logic flow process moves from logic step 124 to logic 125 to exit.

Returning to logic step 116, if no Deadhead Paths were identified in Phase I which connect the Leaving Point (lv) of Flight Pattern $P_2$ and the Returning Point (rt) of Flight Pattern $P_1$ under consideration, the logic flow process moves from logic step 116 to logic step 126 to determine whether any additional Returning Points of $P_1$ associated with the Leaving Point of $P_2$ under consideration exist which have not been processed. If yes, the logic flow process proceeds from logic step 126 to logic step 116 to continue as before described. If not, the logic flow process continues from logic step 126 to logic step 127 to determine whether there are any additional Leaving Points in Flight Pattern $P_2$ to be processed. If yes, the logic flow process proceeds from logic step 127 to logic step 116 to continue as before described. If not, the logic flow process moves from logic step 127 to logic step 124 to continue as before described.

Once the above described setup sub-process has been completed, the solution generation process updates the flight, Flight Pattern, and crew information in the metadata memory while awaiting notification that an irregularity has occurred which requires a solution. Because of the dynamic environment in which the system operates, messages are received continually from the user regarding flight movements, delays, and cancellations. Less frequently received are messages concerning Flight Pattern updates including Report Times, Release Times, modified Flight Patterns for rerouted flight sequences, and new patterns which may require reconstruction of Self-Fixes and One-Way Fixes. Crew updates such as Pairings and qualification updates have no effect on the metadata memory data During the updating process as described above, message inputs are continually monitored to determine whether any user request to solve an actual crew irregularity problem has occurred. If so, the preprocessing sub-process is initiated as described below.

When a crew irregularity occurs, the solution components generated during the setup sub-process are reviewed to determine whether they can be used to cure the irregularity. If they do not provide a cure, then additional solution components will have to be generated as previously described.

In preparation for generating a solution, the crew irregularity problem which is presented is subjected to certain restraints which take into account decision tree preferences that are practiced by airlines in the coordination of crews.

The first constraint set, called the crew constraint set, is represented by equation (1) below, where $$\sum_{jt} x_{ij}^t = 1 \forall\, i, \qquad (1)$$

where "i" refers to a first Pairing, whether broken or unbroken;

"j" refers to a second Pairing, whether broken or unbroken;

"t" refers to the $t^{th}$ fix. For a One-Way Fix there could be plural fixes with different combinations of tk, lv, or rt points. For a Partial Self-Fix, plural fixes with different rt points could occur;

"x" is an integer variable which can take a value of either 0 or 1. It refers to a fix, whether a Partial Self-Fix or a One-Way Fix; and "∀" means "for all". Thus "∀i" means that equation (1) applies to all Pairings.

In the above equation, where i=j, $x_{ij}$ would represent a Partial Self-Fixing. Otherwise, with i≠j, x would represent a One-Way Fix of the $i^{th}$ Pairing by taking flights from the $j^{th}$ Pairing. The equation thus represents the summation over all j and t of the x fixes in the $t^{th}$ option of tk, lv, and rt points.

For each Pairing i, the constraint set of equation (1) above represents that for all possible fixes where Pairing i can be modified as $x_{ij}^t$, whether Self-Fixes when i=j, or One-way Fixes when i≠j, exactly one fix has to be chosen. Thus, the summation of all of the fixes has to be equal to one. This constraint set ensures that for each Pairing selected in the problem model, exactly one way to modify the Pairing is found so that a crew member assigned to the Pairing will be able to go back to his/her home base.

The second constraint set as presented below in equation (2) is referred to as a flight constraint set.

$$\Sigma_{i,j,t} x_{i,j}^t(f) + y_f - S_f = 1 \, \forall f, \text{ where} \quad (2)$$

$y_f$ is an integer variable, where $y_f=0$ if a flight f is covered by a fix "x", and $y_f=1$ if the flight f is not covered by a fix "x";

f refers to an integer indicating a flight identifier;

$S_f$ means a Slack Factor referring to a over-coverage of crew to guarantee the feasibility of the solution; and $x_{ij}^t(f)$ is as previously described. In this context, "f" simply means that flight f is covered by the fix "x".

In order to fully describe the constraint set of equation (2) above, the open flight concept must first be described. For each Open Pairing, all the flights starting from the first flight to a Breaking Point have already been taken by the crew members of the Pairing. However, flights starting from the Recovery Point to the end of the Pairing are all open following the Breaking Point because they have no crew. These latter flights are referred to as Open Flights.

For each Open Flight f, constraint set (2) makes sure that either the flight is covered, or if it could not be covered, then a Cost or penalty will be added to the final solution. On the left hand side of equation (2), all of the fixes $x_{ij}^t$ that cover flight f are summarized. If any of the fixes is chosen, then the flight will be covered. If none of the fixes are selected in the final solution, then $y_f$ has to be set to one to make the equation valid. With a positive value of $y_f$, a cost $C_f$ will be added to the total cost of the solution. In the event that more than one fix is chosen in the final solution, then the flight f will be over-covered. For example, if two fixes of two different Pairings are chosen, then the flight will be covered with two crew members. In this case, if Slack Factor $S_f$ is set to one, the equation will still be valid. Of course, the positive value of $S_f$ will also incur a cost of $B_f$ to be added to the total cost of the solution.

From the above, a solution model is devised which emphasizes One-Way Fixes and Self Fixes $x_{ij}^t$ as represented by equation (3) below.

$$\text{Objective} = \min \Sigma_{i,j}^t C_{i,j}^t x_{i,j}^t + \Sigma_f C_f y_f + \Sigma_f B_f S_f \quad (3)$$

where $C_{i,j}^t$ represents the Cost to the airline in implementing a One-Way Fix $x_{i,j}^t$ when i≠j, and a Self Fix when i=j;

$C_f$ represents the Cost to the airline for flight f which is not covered by any fixes;

$B_f$ represents the Cost of the crew over-coverage for flight f; and x, y, $S_f$, j, and t are as before defined.

The invention comprises the constraint sets of equations (1) and (2) above in combination with equation (3) of the integer program, and One-Way Fixes which allow n Pairings (where n is an integer equal to 1 or greater) to become part of the solution process, and N-Way Swaps to become part of the solution which is generated. Problems of high complexity thereby may be formulated into a readily solvable integer program data structure that may be operated upon by an optimization solver to generate solutions that may include one or more of Partial Self-Fixes, Complete Self-Fixes, One-Way Fixes, and N-Way Swaps of any order.

Figure 10:
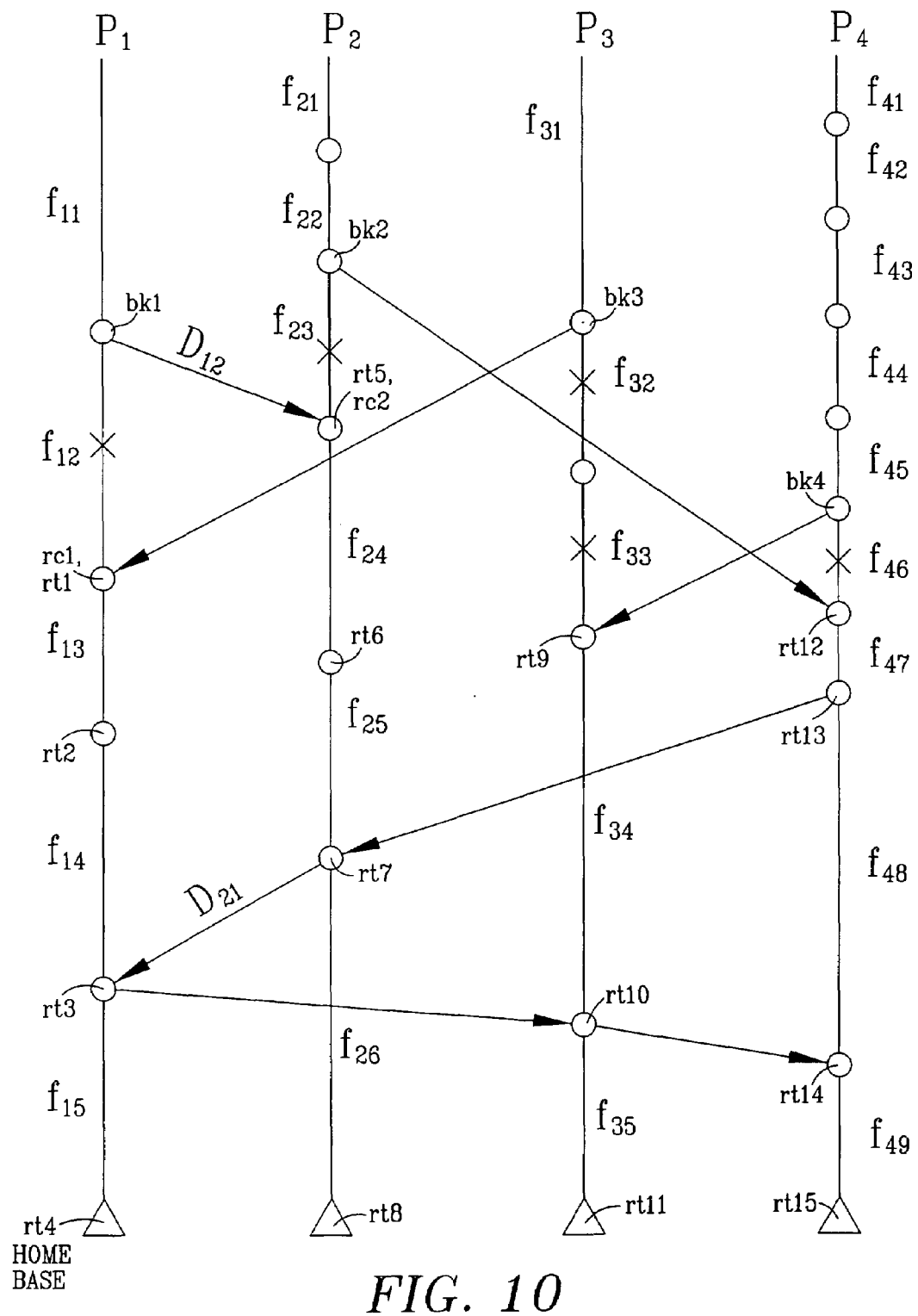
FIG. 10 is a graphic depiction of one-way fix solutions for four pairings.

Referring to FIG. 10, the high potential of One-Way Fix solution components for obtaining solutions of n Pairings is demonstrated. Each of four Open Pairings, $P_1$, $P_2$, $P_3$, and $P_4$, are shown with canceled flights as shown by the x's. Each node of each Pairing represents a different airport. The arrows represent Deadhead Paths with the tail of the arrow indicating a departure from an airport, and the head of the arrow representing an arrival at an airport.

In accordance with the solution generation process as described above, all Deadhead Paths are first determined. Thereafter, based upon the Deadhead Paths that are found, all Self-Fixes of the Open Pairings are determined. Referring to Pairing $P_1$ of FIG. 10, a Breaking Point occurs at bk1. A Recovery Point rc1 and a Returning Point rt1 occur at the intended airport of arrival of the canceled flight. Other potential returning points are shown as rt2, rt3, and rt4.

As previously stated, $x_{ij}$ in the above equations represents a Self-Fix when i=j. Further, the superscript of x is t, which is an integer referring to a particular Self-Fix.

Where supportive Deadhead Paths exist, Possible Partial Self-Fixes for $P_1$ may be represented as follows:

(4) $x_{11}^1$=the Self-Fix obtained by taking a Deadhead Path from bk1 to rt2.

(5) $x_{11}^2$=the Self-Fix obtained by taking a Deadhead Path from bk1 to rt3.

(6) $x_{11}^3$=the Self-Fix obtained by taking a Deadhead Path from bk1 to the home base represented by the triangle and rt4.

Where supportive Deadhead Paths exist, Possible Partial Self-Fixes for $P_2$ may be represented as follows:

(7) $x_{22}^1$=the Self-Fix obtained by taking a Deadhead Path from bk2 to rt6.

(8) $x_{22}^2$=the Self-Fix obtained by taking a Deadhead Path from bk2 to rt7.

(9) $x_{22}^3$=the Self-Fix obtained by taking a Deadhead Path from bk2 to rt8 at the home base represented by the triangle.

Where a supportive Deadhead Path exist, a Possible Partial Self-Fix for $P_3$ may be represented as follows:

(10) $x_{33}^1$=the Self-Fix obtained by taking a Deadhead Path from bk3 to the home base at rt11.

Where supportive Deadhead Paths exist, Partial Self-Fixes for Open Pairing $P_4$ may be represented as follows:

(11) $x_{44}^1$=the Self-Fix obtained by taking a Deadhead Path from bk4 to rt13.

(12) $x_{44}^2$=the Self-Fix obtained by taking a Deadhead Path from bk4 to rt14.

(13) $x_{44}^3$=the Self-Fix obtained by taking a Deadhead Path from bk4 to rt15.

After all possible Deadhead Paths and Self-Fixes have been determined, all possible One-Way Fixes are determined. As before stated, where i≠j, $x_{i,j}$ refers to a One-Way Fix. Thus, a first possible One-Way Fix between $P_1$ and $P_2$, where one or more flights are taken from $P_2$ to fix $P_1$, may be represented by $x^1_{12}$. As an example, the following shows how such a fix can be constructed:

Where supportive Deadhead Paths exist, a One-Way Fix for Open Pairing $P_1$ to take flights of open Pairing $P_2$ may be represented by $x^1_{12}$, which is the One-Way Fix obtained by taking a Deadhead Path from the $P_1$ Breaking Point bk1 to a $P_2$ Recovery Point rc2 that is also a Taking point tk2 of $P_2$. Therefore, the crew may take flight $f_{24}$ from tk2 to a Leaving Point lv2 of $P_2$. At lv2, a Deadhead Path may be taken from after lv2 back to a $P_1$ Returning Point rt1 to complete the One-Way Fix.

A second such One-Way Fix would be represented by $x^2_{12}$. If flights are to be taken from $P_1$ to fix $P_2$, such a One-Way Fix would be represented by $x^1_{21}$ for the first such fix. That is, t=1, i=2, and j=1.

With One-Way Fixes, the solution generation process is not limited to fixing one Open Pairing at a time as would be required for Self-Fixes, or two Open Pairings at a time as would be required of One-Way Swaps and Two-Way Swaps, or Three Open Pairings at a time as would be required for Three-Way Swaps. Rather, the One-Way Fix solution component may accommodate n Parings at a time, where n is any integer greater than zero.

For a first set of solutions, the One-Way Fix solution components are operated upon by the Integer Program Model of equations (1), (2) and (3) above to form an integer program data structure that may be input to the before mentioned CPLEX software program offered commercially by ILOG Inc. The result is a solution which may include one or more of Complete Self-Fixes, One-Way Fixes, and N-Way Swaps. FIG. 10 illustrates one solution for four Open Pairings, which may be symbolically represented by $P_1 \to P_2 \to P_4 \to P_3 \to P_1$ as a four.-way swap.

By way of separate example in executing the ILOG CPLEX program, the following equations (14) through (21) are presented.

For the first constraints of equation (1) above, there results for $P_1$ the following:

$$x^1_{11}+x^2_{11}+x^3_{11}+x^1_{12}+x^2_{12}+x^3_{12}+x^4_{12}+x^5_{12}+x^1_{13}+x^2_{13}+x^1_{14}+x^2_{14}=1 \quad (14)$$

In the solution, by way of example, all of the above terms of equation (14) may be zero, except $x^2_{12}$ which may be equal to one.

For $P_2$, equation (1) above may become, $$x^1_{22}+x^2_{22}+x^3_{22}+x^4_{22}+x^5_{22}+x^6_{22}+x^1_{21}+x^2_{21}+x^3_{21}+x^1_{23}+x^2_{23}+x^1_{24}=1 \quad (15)$$

By way of example, all of the above terms of the equation (15) may be zero, except $x^1_{24}$ which may be equal to one.

For $P_3$ equation (1) above may become, $$x^1_{33}+x^1_{31}+x^2_{31}+x^3_{32}+x^1_{34}+x^2_{34}=1 \quad (16)$$

By way of example, all of the terms of the above equation (16) may be zero except $x^1_{31}$ which may be equal to one.

For $P_4$, equation (1) may become, $$x^1_{44}+x^2_{44}+x^1_{41}+x^1_{42}+x^1_{43}=1 \quad (17)$$

Again by way of example, all of the terms of the above equation (17) are zero, except $x^1_{43}$ which may be equal to one.

With respect to the flight constraints of equation (2) above, and referring to FIG. 10 for purposes of illustrating a solution example, we would have a total of 11 constraints to ensure that each of the Open Flights (flights after the Breaking Point of an Open Pairing, starting from the Recovery Point to the end of each Open Pairing) for each Open Pairing, i.e. $f_{13}$, $f_{14}$, $f_{15}$, $f_{24}$, $f_{25}$, $f_{26}$, $f_{34}$, $f_{35}$, $f_{47}$, $f_{48}$ and $f_{49}$ of FIG. 10, is either covered by One-Way Fixes or uncovered with $y_{ij}$ being non-zero. The following flight constraints for flights $f_{14}$, $f_{15}$ and $f_{25}$ of FIG. 10 are provided as an example:

For flight $f_{14}$, $x^1_{12}+x^1_{21}+x^2_{21}+x^3_{21}+x^1_{31}+x^2_{31}+y_{14-}S_{14}=1$ (18)

Equation (18) is satisfied because on the left hand side of the equation all but $x^1_{31}$, are equal to zero. Since $x^1_{31}$ is equal to one, as stated in connection with equation (16) above, the equation is satisfied.

For flight $f_{15}$, $x^1_1+x^1_{12}+x^2_{12}+x^2_{21}+x^3_{21}+x^2_{31}+x^1_{41}+Y_{15-}S_{15}=1$ (19)

Equation (19) is satisfied because on the left hand side of the equation all except $x^1_{12}$ are equal to zero. With $x_{12}^1$ being equal to one, the equation is satisfied. When the crew of the One-Way Fix $x^1_{12}$ come back to their own pairing $P_1$ by way of Deadhead Path D21, they cover the flight $f_{15}$.

For flight $f_{25}$, $x_{22}^1+x_{12}^1+x_{12}^2+x_{12}^3+x_{12}^4+x_{12}^5+x_{32}^1+x_{32}^2+x_{32}^3+x_{42}^1+y_{22-i\ S22}=1$ (20)

Equation (20) is satisfied because on the left hand side of the equation all except $x^2_{12}$ are zero. Because $x^2_{12}$ is equal to one, the above equation is satisfied.

With the constraints of equations (14) through (20) being satisfied, the math model represented by equation (3) above is submitted to the Optimization Solver 61 of FIG. 6. The final solution which results is that shown in FIG. 10, which involves only One-Way Fixes. The above process of using One-Way Fixes without swaps for submission to the integer program model of equation (3) provides one set of solutions to the Open Pairing problem for n Pairings.

A second set of solutions may be generated by determining all One-Way Swaps and all Two-Way Swaps among n Pairings, and then simplifying through the use of a Matching Transformation. Such transformation is not applicable for N-Way Swaps of a higher order than two.

Referring to FIG. 11(a), 12 nodes are shown. Each node represents a Pairing. The nodes are connected through arcs. A Matching Transformation occurs in FIG. 11(b) in which every vertex has a degree of at most one. That is, no two arcs or node connecting paths share a common vertex. Thus, FIG. 11(b) is said to illustrate a Matching Transformation of FIG. 11(a). As may be clearly seen, a Matching Transformation dramatically simplifies the Open Pairing problem.

The following summarizes the step by step process of performing a Matching Transformation. When an Open Pairing problem is identified, the problem is transformed into a weighted matching problem by first recalling that a One-Way Swap is comprised of a Self-Fixing and a One-Way Fixing, and that a Two-Way Swap is comprised of two One-Way Fixings. The step-by-step process thereafter is as follows:

1. Two vertices, an original vertex and its mirror vertex, represent an Open Pairing. It is assumed that a Self-Fixing always exists, and that the two vertices thus can be connected by a legal arc. The cost C of the arc will be due to such Cost Factors as the number of skipped flights, unutilized crew members, etc.

2. For any two Open Pairings, if a One-Way Swap or a Two-Way Swap exists, select the solution component which is of lesser Cost C. Join the original vertices of the two Open Pairings with an arc, and assign the arc the lesser Cost C above.

3. For each mirror vertex pair, regardless of whether there exists a swap represented by an arc that connects the corresponding original nodes, join the two mirror vertices with an arc, and set the Cost of the arc to zero.

Through use of the above process, an Open Pairing problem may be solved as a weighted matching problem by selecting a set of arcs with minimum Cost to cover each vertex exactly once. The fact that every original vertex has to be covered exactly once guarantees that every Open Pairing will be fixed.

Referring to FIG. 12, four Open Pairings of original and mirror vertices 201/201', 202/202', 203/203', and 204/204' are shown. If a swap component exists between Pairings 201/201' and 204/204', and between Pairings 202/202' and 203/203', an optimal solution of the Matching Transformation may be formed as illustrated by the bold paths between 201 and 201', 202 and 203, 204 and 204', and 202' and 203'. Open Pairing 201/201' is fixed by a Complete Self-Fix of Cost $C_{11'}$, and Open Pairing 204/204' is fixed by a Complete Self-Fix of Cost $C_{44'}$. A Complete Self-Fix is denoted by an arc between an original vertex and its mirror vertex. Open Pairings 202/202' and 203/203' are fixed by a One-Way or a Two-Way Swap of least Cost between the two Pairings. The matching arc between the two mirror vertices 202' and 203' may be ignored since the Cost $C_{2'3'}$, is zero.

The above process of determining all One-Way Swaps and Two-Way Swaps, and thereafter simplifying the resulting problem through a Matching Transformation provides a second set of solutions which may be provided for consideration by the user. The final solution for a user is that which presents the least Cost to the user.

The present invention has been particularly shown and described in detail with reference to a preferred embodiment, which is merely illustrative of the principles of the invention and is not to be taken as a limitation to its scope. It further will be readily understood by those skilled in the art, Operations Research, that substitution of equivalent elements, reordering of steps, and other modifications and alterations of the invention may occur without departing from the scope and spirit of the invention. The appended claims are intended to include within their scope such modifications and alterations.

What is claimed is:

1. An automated system for generating multiple solutions in near real time for n open pairings (where n is an integer) occurring in airline operations, which comprises:
a memory system having stored therein first memory objects defining flight and crew data, legality rules and other data relating to pairings of an airline;
an optimization server in electrical communication with said memory system and receiving user requests for updating said memory system and for generating solutions to cure said n open pairings; and
a microprocessor in electrical communication with said memory system and said optimization server for identifying all deadhead paths occurring among said n open pairings, generating solution components based upon said deadhead paths, storing said deadhead paths and said solution components in said memory system as second memory objects, and upon receiving from said optimization server a user request for curing said n open pairings, extracting said first memory objects and said second memory objects to form an open pairing model, formulating said open pairing model into an integer program data structure to simplify said open pairing model for solution, and generating said multiple solutions based upon said integer program data structure to cure said n open pairings, wherein said integer program data structure is provided by an integer program represented by:

$$\sum_{j,t} x^t_{ij} = 1 \forall\, i, \quad \text{(i)}$$

$$\sum_{i,j,t} x^t_{ij}(f) + y_f - S_f = 1 \forall\, f, \text{ and} \quad \text{(ii)}$$

$$\text{Objective} = \min \sum_{i,j}^{t} C^t_{i,j} x^t_{i,j} + \sum_f C_f y_f + \sum_f B_f S_f \quad \text{(iii)}$$

where "i" represents a first Pairing in a fix, whether broken or unbroken;
where "j" represents a second Pairing in a fix, whether broken or unbroken;
where "f" is an integer, indicating a flight identifier;
where "$C^t_{ij}$" and "$x^t_{ij}$" represent a Cost to an airline in implementing a One-Way Fix "$x^t_{ij}$" when i≠j and a SelfFix "$x^t_{ij}$" when i=j;
where "$C_f$" represents a Cost to an airline for flight f which is not covered by any fixes;
where "$y_f$" is an integer, where $y_f$=0 if a flight f is covered by a fix "x" and $y_f$=1 if flight f is not covered by a fix "x";
where "$B_f$" represents a Cost of crew over-coverage for flight f;
where "$S_f$" represents a slack factor referring to a over-coverage of crew to guarantee a feasibility of a solution; and
where "min." represents a minimum function, in which a smallest number in a data set is returned.

2. The automated system of claim 1, wherein said solution components include partial self-fixes, complete self-fixes, and one-way fixes.

3. The automated system of claim 1, wherein said multiple solutions include one or more n-way swaps.

4. The automated system of claim 1, wherein one of said solution components is a one-way fix in which an open pairing is cured by taking one or more flights from a single remaining one of said n open pairings.

5. The automated system of claim 1, wherein said integer program data structure is comprised of both a crew constraint set and a flight constraint set.

6. The automated system of claim 1, wherein said solution components are one-way swaps and two-way swaps, and a matching transformation rather than said integer program data structure is used to generate said multiple solutions.

7. A method of generating in near real time multiple solutions for n open pairings (where n is an integer) in a microprocessor which is in electrical communication with a memory system and an optimization server, which comprises the steps of: receiving memory objects from said memory system which include all crew and flight records, and legality rules defining operations affecting said n open pairings; identifying all deadhead paths occurring among said n open pairings; generating solution components based upon said deadhead paths for reassigning flights among said n open pairings, and storing said solution components in said memory system; upon receiving a request from a user by way of said optimization server to generate solutions to cure an open pairing, extracting one-way swaps and two-way swaps from said solution components to form an open pairing problem; and performing a matching transformation on said open pairing problem based upon said one-way swaps and said two-way swaps to provide said multiple solutions, wherein said integer program data structure is provided by an integer program represented by:

$$\sum_{j,t} x_{i,j}^t = 1 \forall i, \quad \text{(i)}$$

$$\sum_{i,j,t} x_{i,j}^t(f) + y_f - S_f = 1 \forall f, \text{ and} \quad \text{(ii)}$$

$$\text{Objective} = \min \sum_{i,j}^t C_{i,j}^t x_{i,j}^t + \sum_f C_f y_f + \sum_f B_f S_f \quad \text{(iii)}$$

where "i" represents a first Pairing in a fix, whether broken or unbroken;
where "i" represents a second Pairing in a fix, whether broken or unbroken;
where "f" is an integer indicating a flight identifier;
where "$C_{ij}^t$" said "$x_{ij}^t$" represent a Cost to an airline in implementing a One-Way Fix "$x_{ij}^t$" when i≠j and a SelfFix "$x_{ij}^t$" when i=j;
where "$C_f$" represents a Cost to an airline for flight f which is not covered by any fixes;
where "$y_f$" is an integer, where $y_f$=0 if a flight is covered by a fix "x" and $y_f$=1 if flight f is not covered by a fix "x";
where "$B_f$" represents a Cost of crew over-coverage for flight f;
where "$S_f$" represents a slack factor refering to a over-coverage of crew to guarantee a feasibility of a solution; and
where "min." represents a minimum function, in which a smallest number in a data set is returned.

8. The method of claim 7 further including the step of selecting from said multiple solutions a solution of least cost for transmission to said user by way of said optimization server.

9. The method of claim 7, wherein said matching transformation is comprised of the following steps: for each original vertex and mirror vertex comprising a pair representing an open pairing, connecting said original vertex and said mirror vertex with an arc; for any two of said n open pairings, select one of said one-way swaps and said two-way swaps between said any two of said n open pairings having a least cost; joining original vertices of said any two of said n open pairings with a second arc having said least cost; and for each mirror vertex pair, join mirror vertices of said mirror vertex pair with an arc of cost zero.

10. A method of generating in near real time multiple solutions for n open pairings (where n is an integer) in a microprocessor in electrical communication with a memory system and an optimization server, which comprises: receiving memory objects from said memory system which include crew and flight data, and legality rules relating to said n open pairings; generating solution components for reassigning flights among said n open pairings, and storing said solution components in said memory system; upon receiving a request from a user by way of said optimization server to generate solutions to cure an open pairing, extracting complete self-fixes, partial self-fixes, and one-way fixes from said solution components to form an open pairing problem; applying an integer program to said open pairing problem to formulate said pairing problem into an integer program data structure; and generating said multiple solutions for said n open pairings based upon said integer program data structure, wherein said integer program is represented by:

$$\sum_{j,t} x_{i,j}^t = 1 \forall i, \quad \text{(i)}$$

$$\sum_{i,j,t} x_{i,j}^t(f) + y_f - S_f = 1 \forall f, \text{ and} \quad \text{(ii)}$$

$$\text{Objective} = \min \sum_{i,j}^t C_{i,j}^t x_{i,j}^t + \sum_f C_f y_f + \sum_f B_f S_f \quad \text{(iii)}$$

where "i" represents a first Pairing in a fix, whether broken or unbroken;
where "j" represents a second Pairing in a fix, whether broken or unbroken;
where "f" is an integer indicating a flight identifer;
where "$C_{ij}^t$" and "$x_{i,j}^t$" represent a Cost to an airline in imolemeritina a One-Way Fix "$x_{ij}^t$" when i≠j and a SelfFix "$x_{ij}^t$" when i=j;
where "$C_f$" represents a Cost to an airline for flight f which is not covered by any fixes;
where "$y_f$" is an integer where $y_f$=0 if a flight f is covered by a fix "x" and $y_f$=1 if flight f is not covered by a fix "x";
where "$B_f$" represents a Cost of crew over-coverage for flight f;
where "$S_f$" represents a slack factor referring to a over-coverage of crew to guarantee a feasibility of a solution; and
where "min." represents a minimum function, in which a smallest number in a data set is returned.

11. The method of claim 10, wherein said integer program includes a crew constraint set and a flight constraint set.

12. The method of claim 10, wherein said multiple solutions includes one or more n-way swaps.

13. The method of claim 10, wherein said solution components include deadhead paths.

* * * * *